(12) United States Patent
Ankave

(10) Patent No.: US 11,068,952 B1
(45) Date of Patent: Jul. 20, 2021

(54) SYSTEM AND COMPUTER-IMPLEMENTED METHOD OF IDENTIFYING TATTOO PROVIDERS

(71) Applicant: Joseph Ankave, Los Angeles, CA (US)

(72) Inventor: Joseph Ankave, Los Angeles, CA (US)

( * ) Notice: Subject to any disclaimer, the term of this patent is extended or adjusted under 35 U.S.C. 154(b) by 0 days.

(21) Appl. No.: 16/745,051

(22) Filed: Jan. 16, 2020

(51) Int. Cl.
*G06Q 10/10* (2012.01)
*G06Q 30/06* (2012.01)
*G06F 16/26* (2019.01)
*G06F 16/29* (2019.01)
*G06T 11/00* (2006.01)
*G06T 11/60* (2006.01)
*G06Q 30/02* (2012.01)

(52) U.S. Cl.
CPC ......... *G06Q 30/0605* (2013.01); *G06F 16/26* (2019.01); *G06F 16/29* (2019.01); *G06Q 10/109* (2013.01); *G06Q 30/0205* (2013.01); *G06T 11/001* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 2010/0211566 A1 | 8/2010 | Ghanekar et al. | |
| 2011/0246878 A1* | 10/2011 | Dowdell | G06Q 10/10 715/702 |
| 2011/0307478 A1* | 12/2011 | Pinckney | G09B 7/04 707/724 |
| 2014/0279192 A1* | 9/2014 | Selby | G06Q 30/0631 705/26.7 |
| 2018/0012281 A1* | 1/2018 | Salani | G06Q 30/0627 |
| 2018/0191884 A1* | 7/2018 | Goldgraber | H04M 3/42221 |
| 2018/0211308 A1* | 7/2018 | Cheeks | G06Q 30/0623 |
| 2019/0272487 A1* | 9/2019 | Theus | G06Q 10/06311 |

FOREIGN PATENT DOCUMENTS

WO 2015/073641 A2 5/2015

OTHER PUBLICATIONS

International Search Report and Written Opinion for Application No. PCT/US2020/013915, dated Jul. 28, 2020, 14 pages.

\* cited by examiner

*Primary Examiner* — Alan Torrico-Lopez
(74) *Attorney, Agent, or Firm* — Lewis Roca Rothgerber Christie LLP

(57) ABSTRACT

A storage medium having software instructions configured to cause a processor to receive a series of user preferences, a user's requested dates of availability, transmit a request for tattoo service providers matching the series of user preferences, and receive a series of tattoo service providers matching the user preferences. The instructions are also configured to cause the processor to display an image of a map including the user's desired geographic location, and to display the series of tattoo service providers with a series of visual indicia. The series of visual indicia are overlaid on the image of the map based on geographic coordinates of the series of tattoo service providers.

14 Claims, 14 Drawing Sheets

SYSTEM AND COMPUTER-IMPLEMENTED METHOD OF IDENTIFYING TATTOO PROVIDERS

BACKGROUND

1. Field

The present disclosure relates generally to systems and computer-implemented methods of identifying tattoo providers.

2. Description of the Related Art

Tattoos have been performed for generations as a way to convey individual expression, cultural identity, or religious affiliation. Tattoos have a wide variety of different styles, such as realism, Japanese, geometry, dot work, black work, old school, new school, neo-traditional and Maori, and line work. However, tattoo service providers (e.g., tattoo artists and tattoo establishments) may specialize in only some of these styles. Additionally, some tattoo artists and establishments are private, by-appointment only, whereas other tattoo artists and tattoo establishments accept walk-in clientele.

Conventional computer-aided systems and methods for locating tattoo service providers commonly include typing a generic search term, such as "tattoo artist," into an online search engine, and specifying the user's desired geographic location for the tattoo service. Accordingly, with conventional systems and methods, the user must call or otherwise individually contact the tattoo establishments to determine whether they specialize in the style of tattoo desired by the user, and to determine if the tattoo establishment has availability satisfying the user's availability, including whether the tattoo establishment accepts walk-in clientele or is a private, by-appointment-only establishment.

Thus, with conventional computer-aided systems and methods, the wide variety of different tattoo styles and specializations make it time-consuming and difficult for individuals to locate tattoo service providers that can satisfy both their preferences and availability.

Additionally, tattoo artists seeking employment, either full-time employment or temporary employment, conventionally had to individually contact local tattoo establishments to determine if they had a need for a tattoo artist, including whether they had a need for a tattoo artist specializing in the tattoo style offered by the tattoo artist, or had to rely upon word-of-mouth to learn of employment opportunities.

SUMMARY

The present disclosure is directed to various embodiments of a non-transitory computer-readable storage medium having software instructions stored therein. In one embodiment, the instructions, when executed by a processor, cause the processor to receive, at an electronic device having a display, a series of user preferences, receive, at the electronic device, a user's requested dates of availability, transmit a request, from the electronic device to a remote electronic device, for tattoo service providers matching the series of user preferences, receive, at the electronic device, a series of tattoo service providers matching the series of user preferences, display, on the display of the electronic device, an image of a map including the user's desired geographic location, and display, on the display of the electronic device, the series of tattoo service providers with a series of visual indicia. The series of visual indicia are overlaid on the image of the map based on geographic coordinates of the series of tattoo service providers.

The series of user preferences may include tattoo style, tattoo classification, geographic location of tattoo service provider, body location of tattoo, budget, tattoo size, and any combination thereof.

The series of tattoo service providers may include at least one first tattoo service provider matching the user's requested dates of availability, and at least one second tattoo service provider not matching the user's requested dates of availability. The series of visual indicia may include a first visual indicia for each of the at least on first tattoo service provider and a second visual indicia different than the first visual indicia for each of the at least one second tattoo service provider to enable a user to readily identify tattoo service providers satisfying the user's requested dates of availability.

The first visual indicia may include a first color and the second visual indicia may include a second color different than the first color.

The first visual indicia may include a dynamic image and the second visual indicia may include a static image.

The second visual indicia may include a timer displaying a difference between a first date of availability of the at least one second tattoo service provider and the user's requested dates of availability.

The software instructions, when executed by the processor, may further cause the processor to display, on the display of the electronic device, a series of images each depicting at least one tattoo and each being associated with a series of attributes of the at least one tattoo.

The present disclosure is also directed to various embodiments of a computer-implemented method of identifying tattoo service providers. In one embodiment, the method includes receiving, at an electronic device having a display, a series of user preferences, receiving, at the electronic device, a user's requested dates of availability, transmitting a request, from the electronic device to a remote electronic device, for tattoo service providers matching the series of user preferences, receiving, at the electronic device, a series of tattoo service providers matching the series of user preferences, displaying, on the display of the electronic device, an image of a map including the user's desired geographic location, and displaying, on the display of the electronic device, the series of tattoo service providers with a series of visual indicia. The series of visual indicia are overlaid on the image of the map based on geographic coordinates of the series of tattoo service providers.

The series of user preferences may be tattoo style, tattoo classification, geographic location of tattoo service provider, body location of tattoo, budget, tattoo size, or any combination thereof.

The series of tattoo service providers may include at least one first tattoo service provider matching the user's requested dates of availability, and at least one second tattoo service provider not matching the user's requested dates of availability. The series of visual indicia may include a first visual indicia for each of the at least on first tattoo service provider and a second visual indicia different than the first visual indicia for each of the at least one second tattoo service provider to enable a user to readily identify tattoo service providers satisfying the user's requested dates of availability.

The first indicia may include a first color and the second indicia may include a second color different than the first color.

The first indicia may include a dynamic image and the second indicia may include a static image.

The second indicia may include a timer displaying a difference between a first date of availability of the at least one second tattoo service provider and the user's requested dates of availability.

The method may also include displaying, on the display of the electronic device, a series of images each depicting at least one tattoo and each being associated with a series of attributes of the at least one tattoo.

The inputting of the user preferences may include selecting at least one image of the series of images.

The present disclosure is also directed to various embodiments of a system for identifying tattoo service providers on an electronic device. In one embodiment, the system includes a display of the electronic device, a processor of the electronic device; and a non-transitory computer-readable storage medium of the electronic device coupled to the processor. The non-transitory computer-readable storage medium has software instructions stored therein, which, when executed by the processor, cause the processor to receive, at an electronic device, a series of user preferences, receive, at the electronic device, a user's requested dates of availability, transmit a request, from the electronic device to a remote electronic device, for tattoo service providers matching the series of user preferences, receive, at the electronic device, a series of tattoo service providers matching the series of user preferences, display, on the display of the electronic device, an image of a map including the user's desired geographic location, and display, on the display of the electronic device, the series of tattoo service providers with a series of visual indicia. The series of visual indicia are overlaid on the image of the map based on geographic coordinates of the series of tattoo service providers.

The series of user preferences may include tattoo style, tattoo classification, geographic location of tattoo service providers, body location of tattoo, budget, tattoo size, or any combination thereof.

The series of tattoo service providers may include at least one first tattoo service provider matching the user's requested dates of availability, and at least one second tattoo service provider not matching the user's requested dates of availability. The series of visual indicia comprises a first visual indicia for each of the at least on first tattoo service provider and a second visual indicia different than the first visual indicia for each of the at least one second tattoo service provider to enable a user to readily identify tattoo service providers satisfying the user's requested dates of availability.

The first visual indicia may include a first color and the second visual indicia may include a second color different than the first color, or the first visual indicia may include a dynamic image and the second visual indicia may include a static image.

The second visual indicia may include a timer displaying a difference between a first date of availability of the at least one second tattoo service provider and the user's requested dates of availability.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable system or computer-implemented method.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure relates generally to systems and computer-implemented methods of identifying relevant tattoo service providers (i.e., tattoo artists and/or tattoo shops). In one or more embodiments, the systems and methods of the present disclosure display the tattoo service providers within the user's specified geographic area (e.g., city or postal code, or a specified proximity thereto) that are able to satisfy the user's preferences, such as the user's desired style, theme, body location, and/or budget. In one or more embodiments, the systems and methods of the present disclosure are configured to visually distinguish between tattoo service providers that can satisfy the user's availability (e.g., dates and/or times of availability) and those tattoo service providers that cannot currently satisfy the user's availability, and may display a timer to indicate the difference (e.g., in days or hours) between the user's availability and the first date and/or time of availability of each of the tattoo service providers that cannot currently satisfy the user's availability. In this manner, the systems and computer-implemented methods of the present disclosure improve the efficiency of identifying suitable tattoo service providers and scheduling tattoo services compared to conventional systems and methods in which all of the tattoo establishments within a geographic location are listed without identifying whether those tattoo service providers can satisfy the user's preferences for tattoo style and without indicating whether the tattoo service provide has availability satisfying the user's availability or desired dates and times, or even whether the tattoo service provider accepts walk-in clients or clients by appointment-only.

In one or more embodiments, the systems and computer-implemented methods of the present disclosure are configured to enable tattoo establishments to identify tattoo artists who are available for guest work or a full-time position based on a set of criteria, such as, for example, geographic location, budget (e.g., hourly rate or flat fee), and style specialization. In one or more embodiments, the systems and computer-implemented methods of the present disclosure are also configured to enable tattoo artists to identify tattoo shops (or tattoo shop owners) that have availability for guest work or a full-time position based on a set of criteria specified by the tattoo artist, such as, for example, geographic location, budget (e.g., hourly rate or flat fee), and style specialization. Accordingly, the systems and computer-implemented methods of the present disclosure according to one or more embodiments of the present disclosure may be utilized by tattooees, tattoo artists, and tattoo shop owners.

Figure 1:
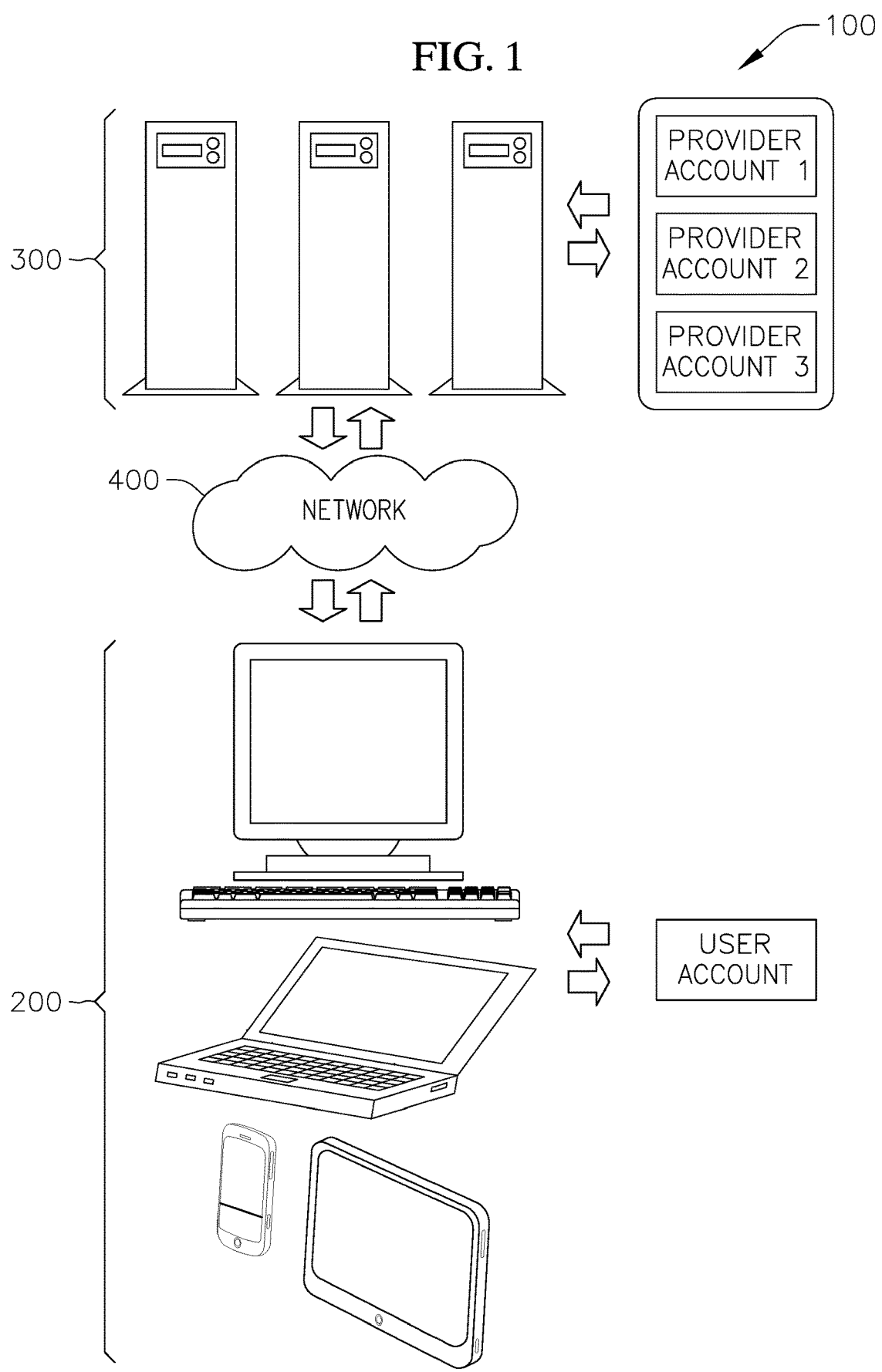
FIG. 1 is a schematic view of system for identifying tattoo service providers according to one embodiment of the present disclosure.

FIG. 1 depicts a system 100 configured to enable one or more users to identify relevant tattoo service providers according to one embodiment of the present disclosure. In the illustrated embodiment, the system 100 includes an electronic device 200 configured to communicate with one or more servers 300 over a network 400. In one or more embodiments, the electronic device 200 may be a mobile or a non-mobile electronic device, such as, for example, a desktop computer, a laptop computer, a smartphone, a wearable device (e.g., a smart watch or smart glasses), or a tablet computer. The electronic device 200 may be any other suitable type or kind of electronic device that can receive and transmit data via the network 400. In one or more embodiments, the electronic device 200 may be operated by a user desirous to identify tattoo service providers satisfying a set of preferences (e.g., tattoo placement, style, color, availability, budget, and/or geographic location) that may be specified by, for example, creating a user account on the electronic device 200. Additionally, in one or more embodiments, tattoo service providers (e.g., tattoo artists or tattoo establishments) may create a provider account on one of the servers 300 that includes a series of parameters associated with the tattoo service provider, such as, for example, geographic location, availability (e.g., dates, times, walk-ins accepted, and/or appointments required), specialization (e.g., color tattoos, Japanese style), and/or price (e.g., hourly rate or fixed fee). Accordingly, as described in more detail below, the system 100 enables a user to identify suitable tattoo service providers by receiving the user's preferences at the electronic device 200 and communicating over the network 400 with the one or more servers 300 to access the tattoo service providers' parameters.

Figure 2:
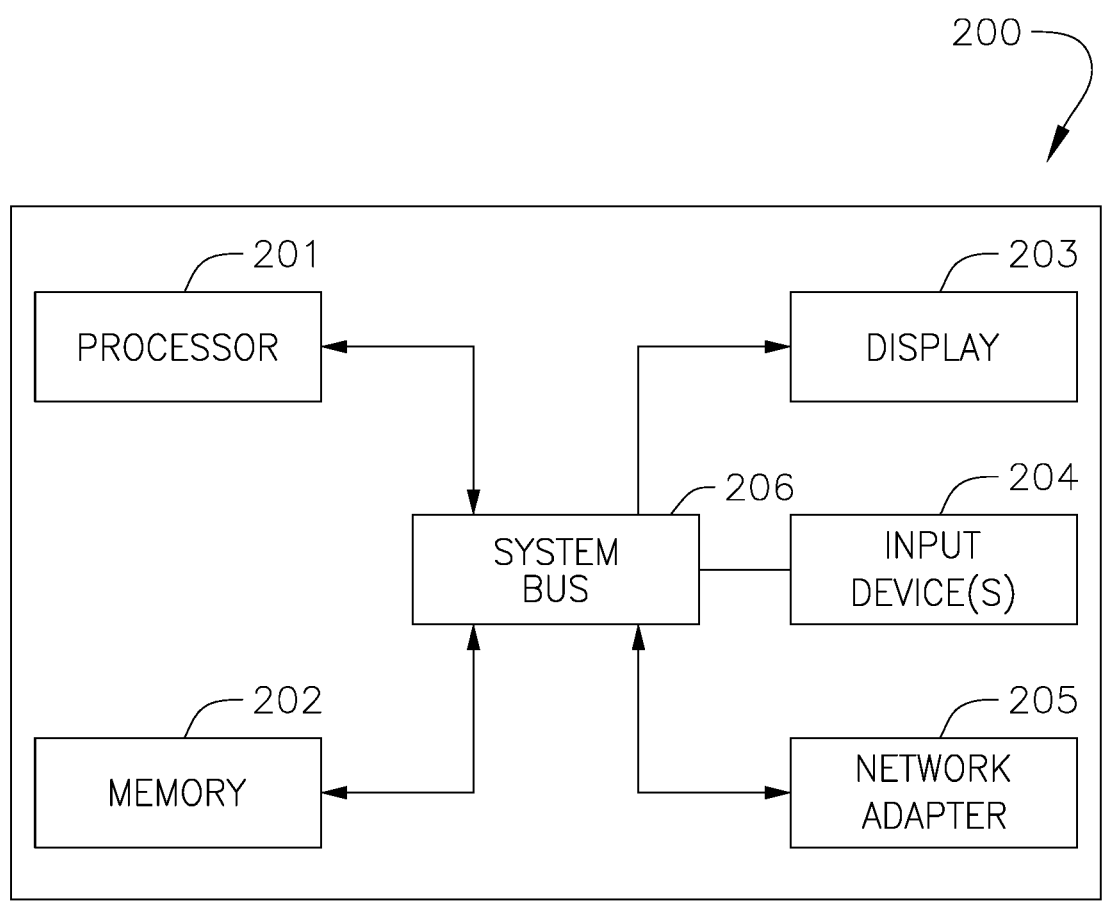
FIG. 2 is a block diagram of an electronic device of the system in FIG. 1 according to one embodiment of the present disclosure.

FIG. 2 is a block diagram of the electronic device 200 of FIG. 1 according to one embodiment of the present disclosure. In the illustrated embodiment, the electronic device includes a processor 201, a memory device 202 (e.g., persistent memory such as NAND flash memory), a display 203 (e.g., a liquid crystal display (LCD) or light-emitting diode (LED) display), one or more input devices 204 (e.g., a touch sensitive display, a keyboard, a microphone, and/or a mouse), a network adapter 205, and a system bus 206. In one or more embodiments, the processor 201, the memory device 202, the display 203, the one or more input devices 204, and the network adapter 205 are configured to communicate with each other over the system bus 206.

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example a processor may include two processors, an FPGA and a CPU, interconnected on a PWB.

The memory 202 of the electronic device 200 stores instructions that, when executed by the processor 201, cause the processor 201 to perform various functions. In one or more embodiments, the instructions cause the processor 201 to read and/or write data to and from the memory 202, and to send commands to, and receive data from, various other components of the electronic device 200, including the display 204 and the network adapter 205.

In one or more embodiments, the memory 202 stores instructions that, when executed by the processor 201, cause the electronic device 200 to receive a plurality of preferences for a tattoo that are input by a user of the electronic device (e.g., input by the user utilizing the one or more input devices 204). The user preferences may be any combination of two or more of the following: tattoo style or theme (e.g., realism, Japanese, dot work, black work, old school, new school, micro-tattoo ("single-needle"), neo-traditional, tribal (e.g., Celtic, Maori, Polynesian, Tibetan), or line work), concept or classification of the object to be tattooed (e.g., scene, animals, geometry, characters, nature, human portrait, fantasy, object, abstract, symbols, landscape, flowers, or typography), a geographic location of the tattoo establishment (e.g., a city or a postal code, or a specified proximity thereto), placement of the tattoo on the body (e.g., body part where the tattoo will be inked), budget (e.g., an hourly rate or a fixed or flat fee that the tattoo establishment or the individual tattoo artist charges), and size of the tattoo (e.g., small, medium, or large, such as a project requiring multiple tattoo sessions). In one or more embodiments, the user preferences may include any other suitable parameters, such as, for example, the average user rating of the tattoo establishment (e.g., 4 out of 5 stars or higher), the type of clientele the tattoo establishment accepts (e.g., private, by appointment only, or accepting walk-in customers), and whether the desired tattoo will be in color or black ink only. The user may input the user's preferences by the one or more input devices 204 of the electronic device 200, such as a mouse, a keyboard, a microphone, and/or a touch-sensitive display.

Figure 3:
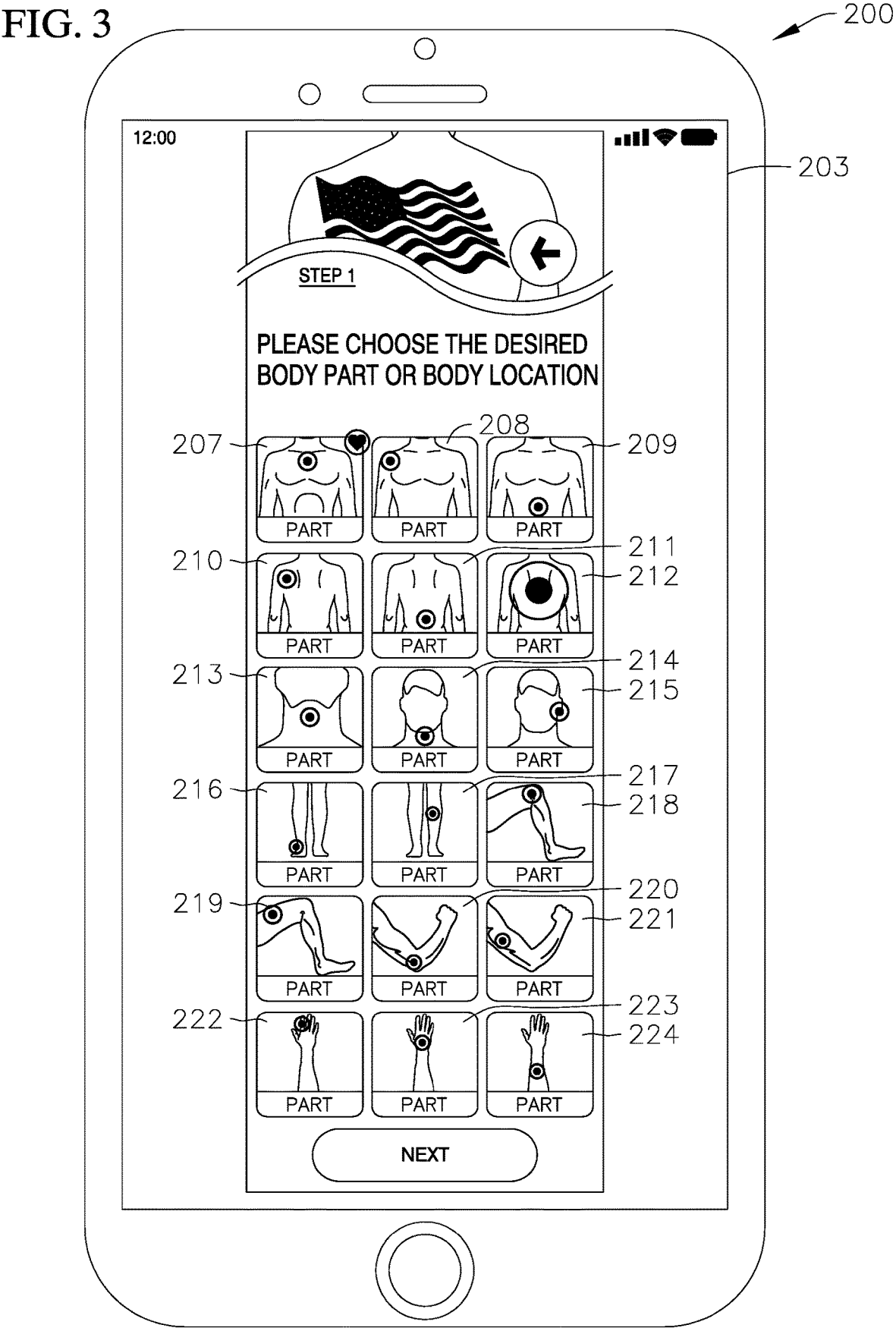
FIG. 3 is a view of the electronic device of FIG. 2 displaying a series of images each corresponding to a different location on the body according to one embodiment of the present disclosure to enable the user to input the desired location on the body where the tattoo will be inked.

In one or more embodiments, the memory 202 stores instructions that, when executed by the processor 201, cause the processor 201 to display, on the display 203 of the electronic device 200, one or more images that enable a user to input one or more of the user's preferences. For instance, in one or more embodiments, the memory 202 stores instructions that, when executed by the processor 201, cause the processor 201 to display, on the display 203 of the electronic device 200, a series of images depicting different body parts or different locations on the body. For instance, in one or more embodiments, the instructions may be configured to display images of a torso, a back, a face, a neck, one or more legs (or portions thereof), one or more hands, and one or more arms (or portions thereof). Selecting, utilizing the one or more input devices 204 of the electronic device 200, one or more of the images corresponding to the desired body part or desired body location for the tattoo inputs the body part or body location associated with the selected image(s) as one of the user's preferences. In one or more embodiments, the user's preferences may be entered in any other suitable manner, such as, for example, by selecting the desired body part or location from a list of body parts or body locations, or by typing the desired body part or desired body location into a text box. FIG. 3 depicts the display 203 of the electronic device 200 displaying a series of images of body portions each having a marker (e.g., a red target) indicating the location on the body for which each image is associated according to one embodiment of the present disclosure. Selecting, utilizing the one or more input devices 204, one or more of the images inputs the desired location on the body where the tattoo will be inked. In the illustrated embodiment, the instructions stored in the memory 202, when executed by the processor 201, cause the processor 201 to display, on the display 203 of the electronic device 200, images 207-209 of the front of the torso with marks on the upper chest, the shoulder, and the stomach, respectively, images 210-212 of the back with markers on the shoulder blade, the lower back, and the upper back, respectively, images 213-215 of a head with markers on the back of the neck, the front of the neck, and an ear, respectively, images 216-219 of legs with markers on a foot, a shin, a knee, and an inner thigh, respectively, and images 220-224 of an arm with markers on an elbow, a bicep, a finger, the back of a hand, and a forearm, respectively. In one or more embodiments the instructions stored in memory 202 may be configured to display, on the display 203 of the electronic device 200, any other suitable number of images of body parts or locations on the body.

Figure 4:
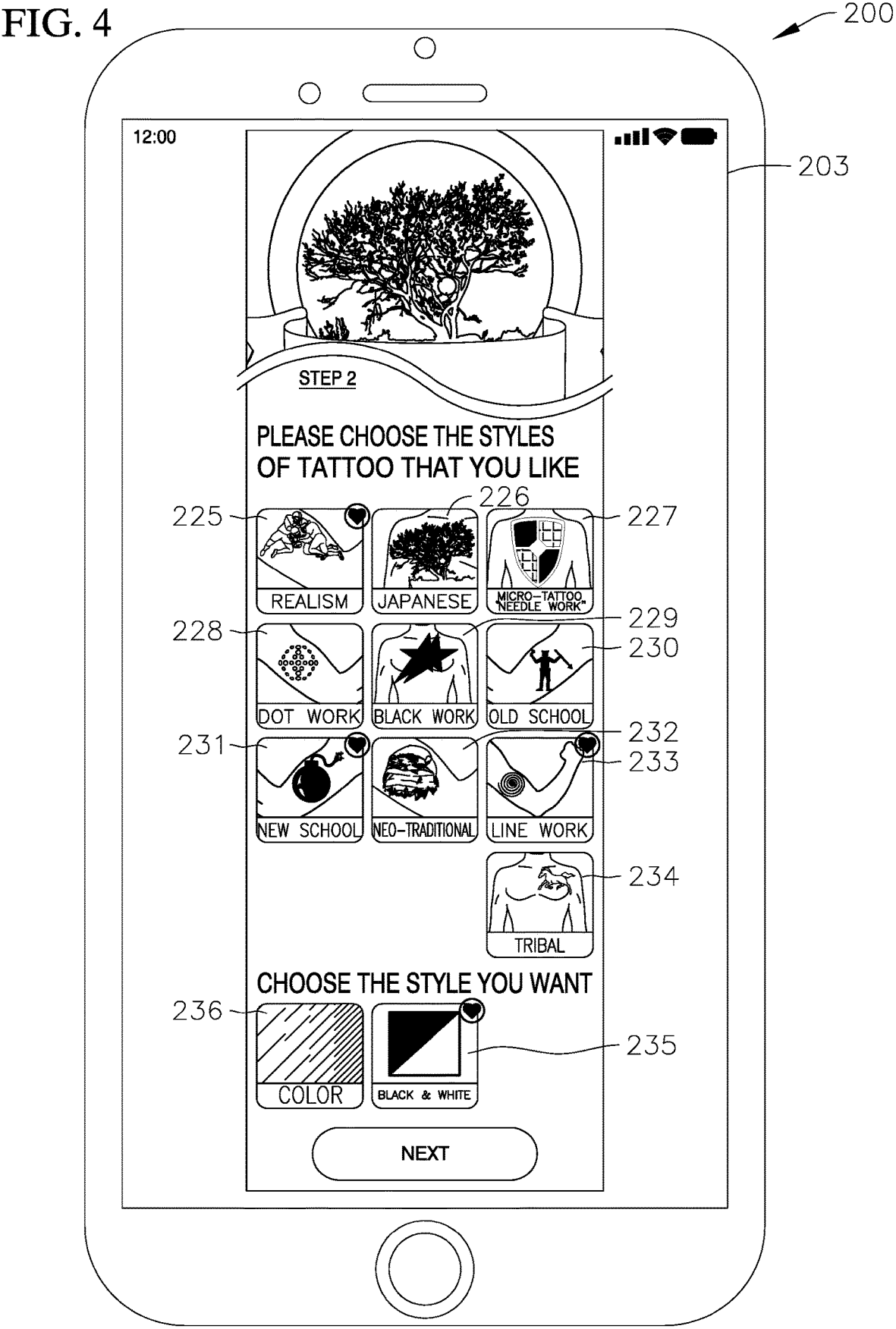
FIG. 4 depicts the display of the electronic device of FIG. 2 displaying a series of images of tattoos or tattoo designs each associated with a tattoo style according to one embodiment of the present disclosure to enable the user to input the desired style of the tattoo to be inked on the user's body.

In one or more embodiments, the memory 202 stores instructions that, when executed by the processor 201, cause the processor 201 to display, on the display 203 of the electronic device 200, a series of images each associated with one or more different tattoo styles. FIG. 4 depicts the display 203 of the electronic device 200 displaying a series of images of tattoos or tattoo designs each associated with one or more tattoo styles according to one embodiment of the present disclosure. Selecting, utilizing the one or more input devices 204, one or more of the images inputs the desired style(s) of the tattoo to be inked on the user's body. In the illustrated embodiment, the instructions stored in the memory 202, when executed by the processor 201, cause the processor 201 to display, on the display 203 of the electronic device 200, images 225-234 of tattoos associated with realism style, Japanese style, micro-tattoo ("needle work"), dot work, black work, old school, new school, neo-traditional, line work, and tribal (e.g., Celtic, Maori, Polynesian, Tibetan), respectively. Additionally, in the illustrated embodiment, the instructions stored in the memory 202, when executed by the processor 201, cause the processor 201 to display, on the display 203 of the electronic device 200, an image 235 associated with black and white tattoos, and an image 236 associated with color tattoos. Selecting, utilizing the one or more input devices 204, the image 235 and/or the image 236 inputs the desired color of the tattoo to be inked on the user's body. In one or more embodiments the instructions stored in memory 202 may be configured to display any other suitable number of images of different tattoo styles. In one or more embodiments, the user's desired tattoo style may be entered in any other suitable manner, such as, for example, by selecting the desired style from a list of styles (e.g., a dropdown list), or by typing the desired style into a text box.

Figure 5:
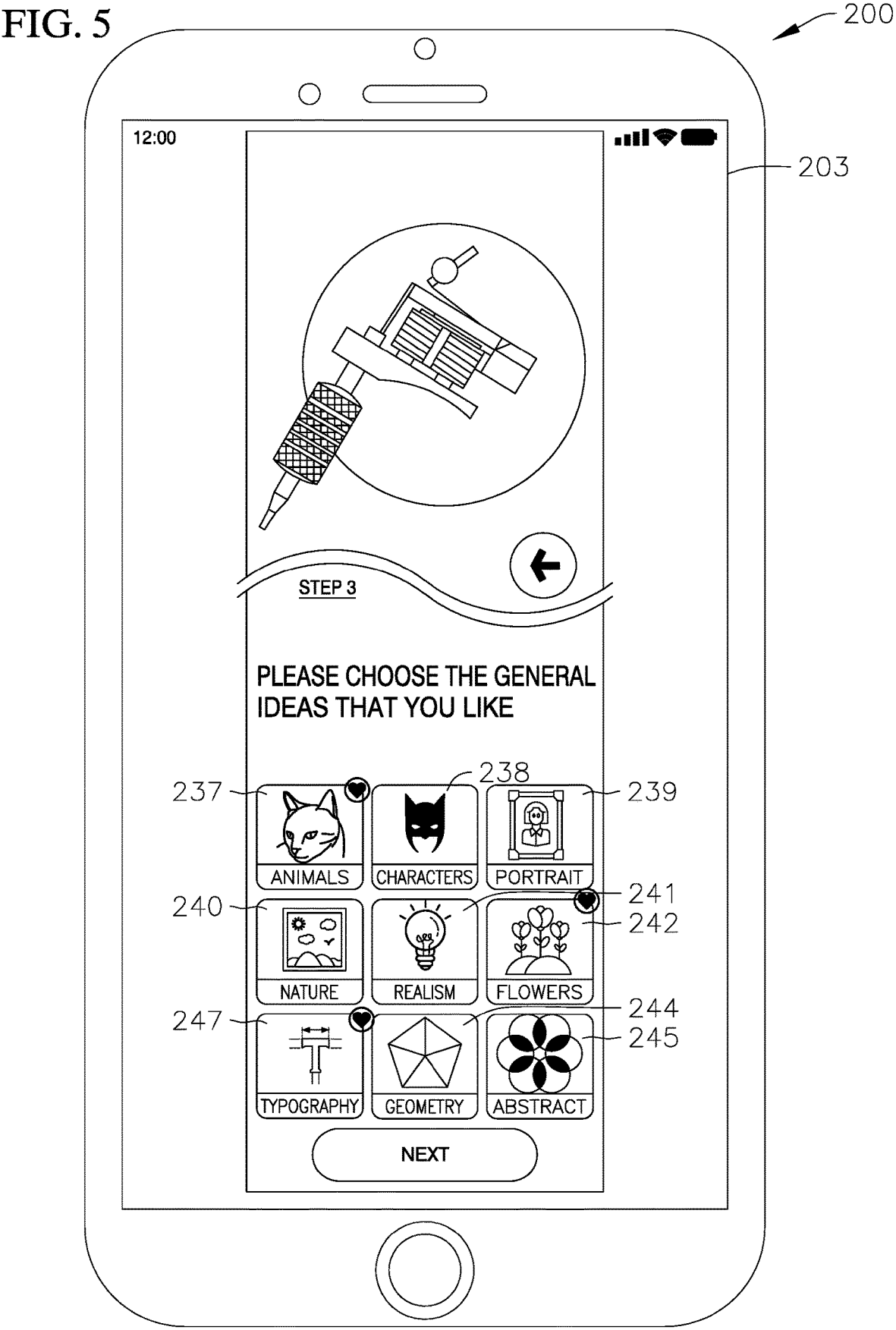
FIG. 5 depicts the display of the electronic device of FIG. 2 displaying a series of images each associated with a theme or general idea according to one embodiment of the present disclosure to enable the user to input the desired theme or general idea of the tattoo to be inked on the user's body.

In one or more embodiments, the memory 202 stores instructions that, when executed by the processor 201, cause the processor 201 to display, on the display 203 of the electronic device 200, a series of images each associated with one or more different general tattoo ideas or classifications of objects. FIG. 5 depicts the display 203 of the electronic device 200 displaying a series of images each associated with one or more general ideas or classifications of objects according to one embodiment of the present disclosure. Selecting, utilizing the one or more input devices 204, one or more of the images inputs the desired general idea or classification of the object to be inked on the user's body. In the illustrated embodiment, the instructions stored in the memory 202, when executed by the processor 201, cause the processor 201 to display, on the display 203 of the electronic device 200, images 237-245 associated with animals, characters, portraits, nature (e.g., landscapes), realism, flowers, typography geometry, and abstract, respectively. Selecting, utilizing the one or more input devices 204, one or more of the images 237-245 inputs the desired general idea of classification of the tattoo to be inked on the user's body. In one or more embodiments the instructions stored in memory 202 may be configured to display any other suitable number of images of different tattoo styles. In one or more embodiments, the general idea or object classification may be entered in any other suitable manner, such as, for example, by selecting the desired idea or object classification from a list of ideas or object classifications (e.g., a dropdown list), or by typing the desired idea or object classification into a text box.

Figure 6:
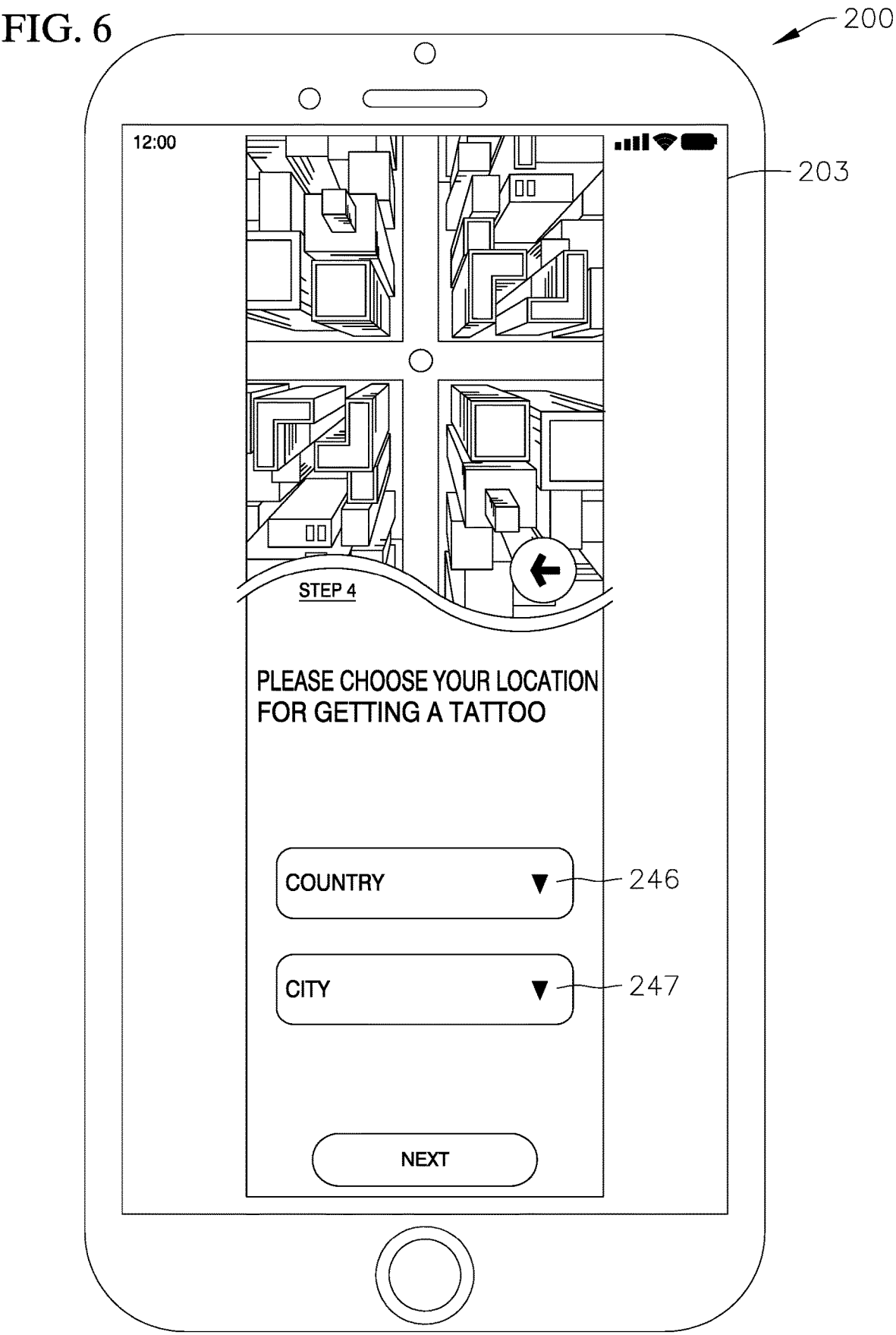
FIG. 6 depicts the display of the electronic device of FIG. 2 displaying a "Country" dropdown box and a "City" dropdown box according to one embodiment of the present disclosure to enable the user to select the country (from a list of countries) in which tattoo service provider is located and to select the city (from a list of cities) in which the tattoo service provider is located, respectively.

In one or more embodiments, the memory 202 stores instructions that, when executed by the processor 201, cause the processor 201 to display, on the display 203 of the electronic device 200, one or more images, text boxes, and/or dropdown menus configured to enable a user to input the user's desired location of the tattoo service provider. FIG. 6 depicts the display 203 of the electronic device 200 displaying a "Country" dropdown box 246 to enable the user to select the country (from a list of countries) in which tattoo service provider is located and a "City" dropdown box 247 to enable the user to select the city (from a list of cities) in which the tattoo service provider is located. In one or more embodiments, the user's preferred location may be input into the electronic device 200 in any other suitable manner, such as, for example, by typing, utilizing one of the input devices 204 of the electronic device 200, the desired location (e.g., city, postal code, address, or area in proximity thereto) into a text box, or by interacting with an interactive map displayed on the display 203 to define the preferred area, such as by drawing a perimeter around the preferred area.

In one or more embodiments, the desired location of the tattoo establishment may be input as an area including (e.g., surrounding) the current geographic location of the electronic device 200. For example, in one or more embodiments, the memory 202 stores instructions that, when executed by the processor 201, cause the network adapter 205 to transmit the current location of the electronic device 200 (e.g., the GPS coordinates of the electronic device 200 obtained from a GPS device in the electronic device 200) to the remote electronic device (e.g., the one or more servers 300).

In one or more embodiments, the memory 202 stores instructions that, when executed by the processor 201, cause the electronic device 200 to receive a user's date or dates of availability for performance of the tattoo services (e.g., a range of dates, a range of times on a particular date, and combinations thereof). In one or more embodiments, the memory 202 stores instructions that, when executed by the processor 201, cause the display 203 to display an image of a calendar. Selecting, utilizing the one or more input devices 204 (e.g., a mouse, a keyboard, a microphone, and/or a touch-sensitive display), one or more days on the image of the calendar inputs the selected date(s) as the user's date(s) of availability. In one or more embodiments, the user may input the user's date or dates of availability in any other suitable manner utilizing the one or more input devices 204 of the electronic device 200, such as, for example, typing the user's date(s) and/or time(s) of availability into one or more text boxes displayed on the display 203 of the electronic device 200.

In one or more embodiments, the memory 202 stores instructions that, when executed by the processor 201, cause the processor 201 to save the user's preferences in the memory 202 of the electronic device 200. In one or more embodiments, the memory 202 stores instructions that, when executed by the processor 201, cause the network adapter 205 of the electronic device 200 to transmit, from the network adapter 205 of the electronic device 200 to a remote electronic device (e.g., one of the servers 300) over the network 400, the user's preferences to be saved in the memory of the remote electronic device (e.g., the user's preferences may be saved in the "cloud").

In one or more embodiments, the memory 202 stores instructions that, when executed by the processor 201, cause the network adapter 205 of the electronic device 200 to transmit, from the network adapter 205 of the electronic device 200 to a remote electronic device (e.g., one of the servers 300) over the network 400, a request for tattoo establishments that match (i.e., satisfy) the user's preferences (e.g., the user's desired tattoo style, theme, body placement, and/or budget) input into the electronic device 200 in the manner described above.

In one or more embodiments, the memory 202 stores instructions that, when executed by the processor 201, cause the network adapter 205 of the electronic device 200 to receive a batch or a list of a plurality of tattoo establishments from the remote electronic device (e.g., one of the servers 300) over the network 400. The plurality of tattoo establishments received by the electronic device 200 match (i.e., satisfy) the user's preferences. In one or more embodiments, each of the tattoo establishments is associated with a set of geographic coordinates (e.g., GPS coordinates including a latitude, a longitude, and an elevation position). Although in one or more embodiments the geographic coordinates may be defined in terms of latitude, longitude, and elevation, in one or more embodiments the geographic coordinates may be represented in any other suitable system for defining a particular geographic location.

In one or more embodiments, the memory 202 stores instructions that, when executed by the processor 201, cause the processor to display, on the display 203 of the electronic device 200, an image of a map containing the geographic location or area that was specified as one of the user's preferences (e.g., a map depicting a city or a portion thereof).

In one or more embodiments, the memory 202 stores instructions that, when executed by the processor 201, cause the processor to display, on the display 203 of the electronic device 200, visual indicia (e.g., markers or virtual "pins") of the tattoo establishments overlaid on the image of the map. In one or more embodiments, the locations of the visual indicia of the tattoo establishments on the image of the map are based on the geographic coordinates of the tattoo establishments (i.e., the visual indicia of the tattoo establishment are located at positions on the map corresponding to the geographic locations of the tattoo establishments). For instance, a tattoo establishment located at 123 Main Street may be depicted with a marker on the portion of the map corresponding to that address.

In one or more embodiments, the instructions stored in the memory 202, when executed by the processor 201, cause the electronic device 200 to display the visual indicia of the tattoo establishments that have availability satisfying the user's selected date(s) of availability differently than tattoo establishments that do not have availability satisfying the user's selected date(s) of availability. For instance, in one or more embodiments, the instructions stored in the memory 202, when executed by the processor 201, cause the processor to display the visual indicia of the tattoo establishments that have availability satisfying the user's selected date(s) of availability with a first color (e.g., green) and to display the visual indicia of the tattoo establishments that do not have availability satisfying the user's selected date(s) of availability with a second color (e.g., red) different than the first color. In one or more embodiments, the instructions stored in the memory 202, when executed by the processor 201, cause the display 203 to display the visual indicia of the tattoo establishments that have availability satisfying the user's selected date(s) of availability with a static image and to display the visual indicia of the tattoo establishments that do not have availability satisfying the user's selected date(s)

of availability with a dynamic image (e.g., a vibrating or rotating icon). Additionally, in one or more embodiments, the instructions stored in the memory 202, when executed by the processor 201, cause the display 203 of the electronic device 200, to display the visual indicia of the tattoo establishments that do not have availability satisfying the user's selected date(s) of availability with a timer displaying a difference between the first date of availability of each of the respective tattoo establishments and the user's selected date(s) of availability. For instance, in one or more embodiments, if the user specified a date of availability of December 12th and one of the tattoo establishments matching the user's specified preferences did not have availability until December 14th, the timer may display the words "2 days" next to the visual indicia of the tattoo establishment overlaid on the map. Additionally, in one or more embodiments, if the user specified a date of availability of December 12th between 8:00 am and 2:00 pm and one of the tattoo establishments matching the user's specified preferences did not have availability on December 12th until 5:00 pm, the timer may display the words "3 hours" next to the visual indicia of the tattoo establishment overlaid on the map. In this manner, the systems and computer-implemented methods of the present disclosure are configured to enable more time-efficient identification of tattoo service providers compared to conventional systems and methods that display all of the tattoo establishments within a specified geographic area without identifying which establishments can satisfy the user's preferences and without identifying which establishes can satisfy the user's availability.

Figure 7:
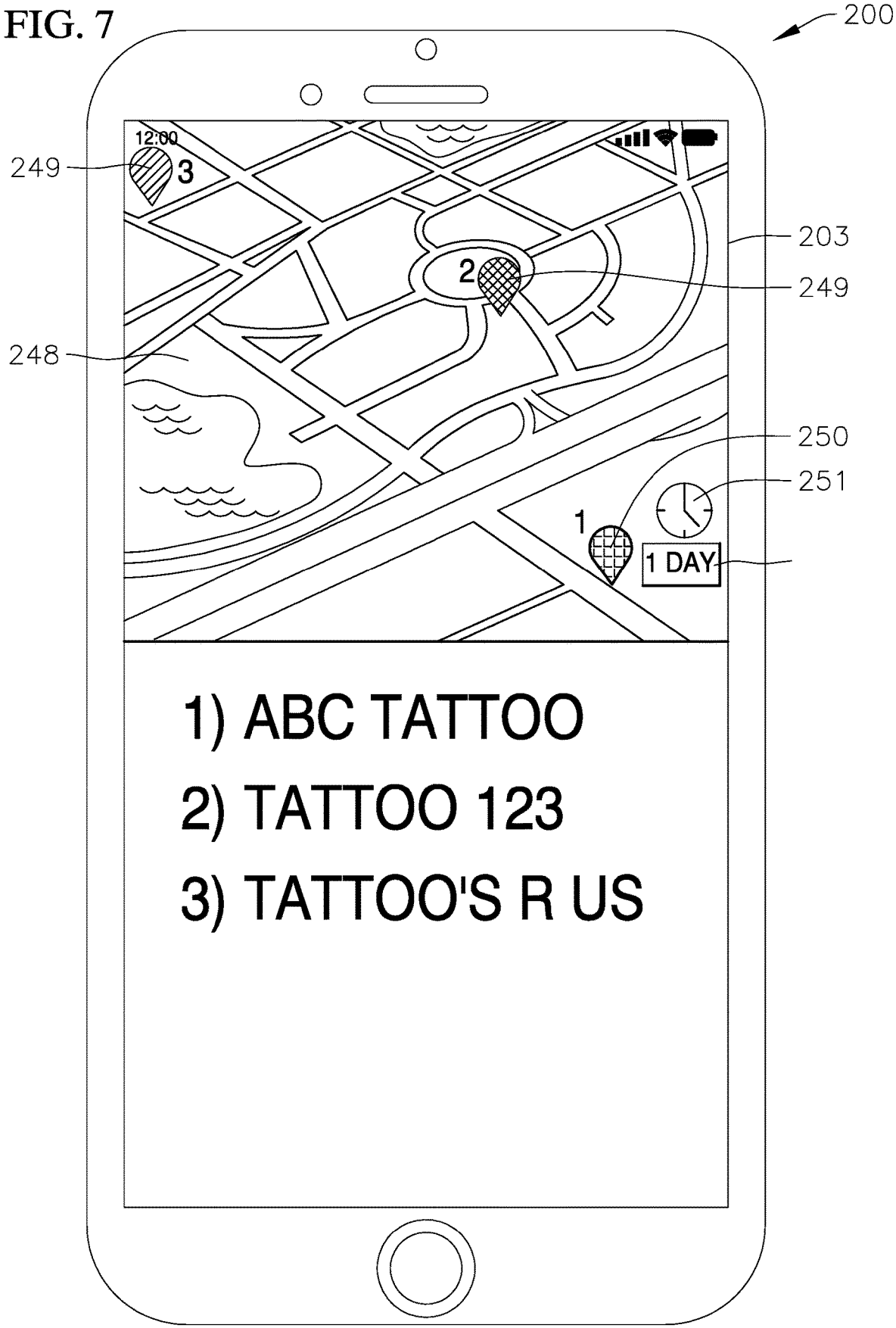
FIG. 7 depicts the display of the electronic device of FIG. 2 displaying an image of a map and a series of markers overlaid on the map indicating the tattoo establishments that satisfy the user's preferences according to one embodiment of the present disclosure.

FIG. 7 depicts the display 203 of the electronic device 200 displaying an image of a map 248 and visual indicia 249, 250 (e.g., markers or virtual pins) of the tattoo establishments overlaid on the image of the map 248. In the illustrated embodiment, the visual indicia 249 indicate the tattoo service providers that satisfy the user's selected preferences (e.g., geographic location, style, budget, etc.) but not the user's availability, and the visual indicia 250 indicate satisfy both the user's selected preferences and the user's selected availability. Additionally, FIG. 7 depicts timers 251 proximate (e.g., adjacent) to the visual indicia 250 to indicate the difference between the user's selected availability and the first availability of each of the tattoo service providers associated with visual indicia 250. Visual indicia 249, 250 of the tattoo establishments may include images, photographs, graphics, animations, videos, and/or combinations thereof. For instance, in one or more embodiments, the visual indicia 249, 250 of the tattoo establishments may include a trademark of the tattoo establishment (e.g., a logo), a photograph of the storefront of the tattoo establishment, or a standard drop pin.

Figure 8:
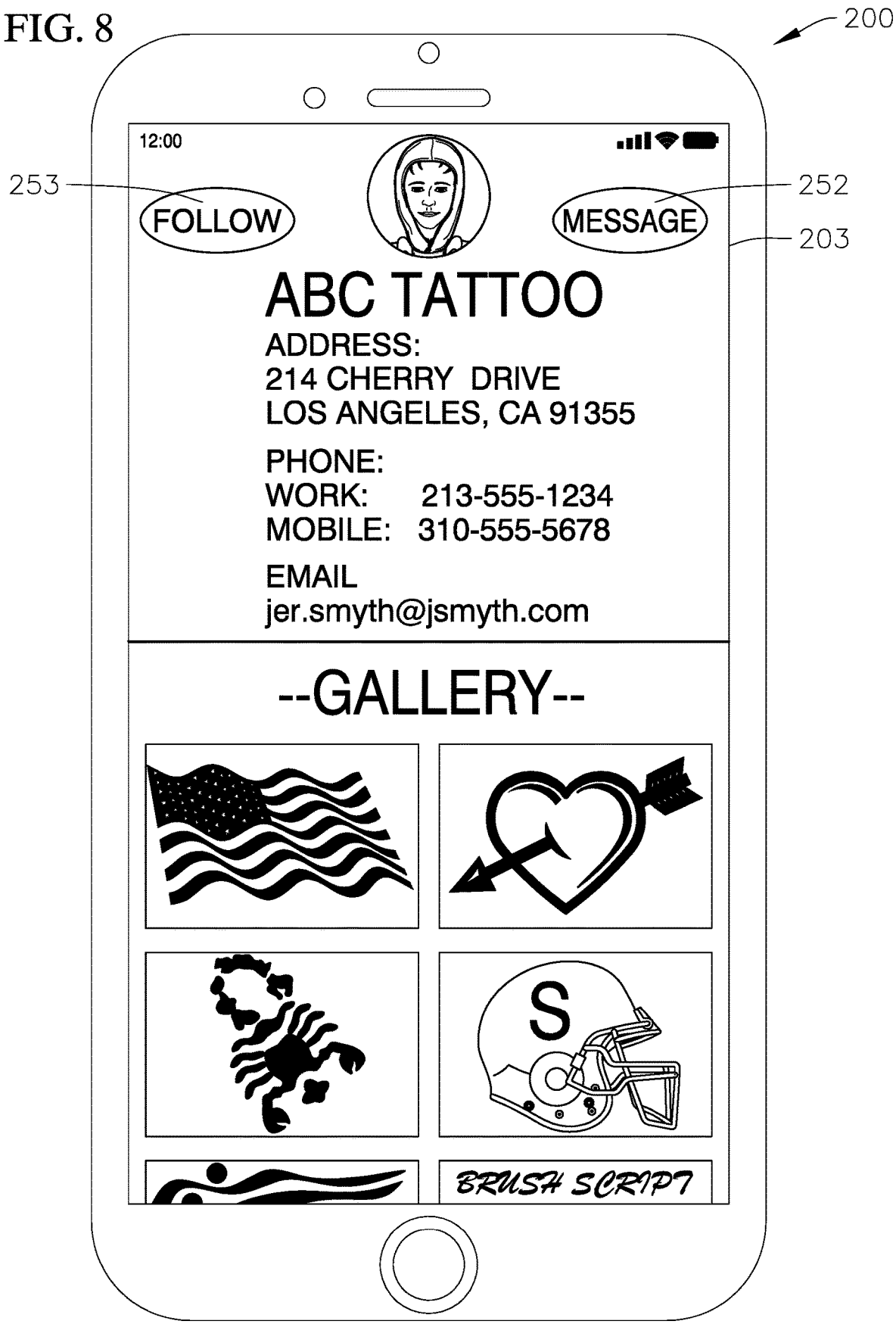
FIG. 8 depicts the display of the electronic device of FIG. 2 displaying a profile page of a tattoo establishment according to one embodiment of the present disclosure.

In one or more embodiments, the memory 202 stores instructions that, when executed by the processor 201, cause the display 203 of the electronic device 200 to display a profile page of the tattoo establishment when the user selects, via one of the input devices 204 of the electronic device 200, one of the tattoo establishments (e.g., by clicking on the visual indicium 249, 250 on the image of the map 248 associated with one of the tattoo establishments, or by clicking on a link displayed below the image of the map 248). FIG. 8 depicts a profile page of a tattoo establishment according to one embodiment of the present disclosure. In one or more embodiments, the profile page of the tattoo establishment may list one or more of the following: user reviews, a physical address, an email address, a telephone number, and one or more themes or styles of specialization (e.g., Neo-Japanese). In the illustrated embodiment, the profile page of the tattoo establishment also includes a series of images of tattoos from the tattoo portfolio of the tattoo artist or the tattoo establishment, and a series of sketches of tattoo designs. Additionally, in the illustrated embodiment, the profile page of the tattoo establishment may include a link 252 to message the tattoo establishment and a link 253 to connect (i.e., "follow") the tattoo establishment. In one or more embodiments, when the user selects the link 253 to connect with the tattoo establishment, the software instructions stored in the memory 202 are configured to generate push notifications regarding the tattoo establishment, such as, for example, a notification when the tattoo establishment posts new images or sketches, when one of the tattoo artists at the tattoo establishment has new availability (e.g., due to a cancellation), or when the tattoo service provider is offering promotions or specials. In one or more embodiments, the push notifications may indicate when a tattoo style is in demand, prompt a user to post a review, indicate an individual is seeking a guest tattoo position in a particular geographic location, indicate a tattoo shop is seeking a tattoo artist for fulltime or guest work, indicate a tattoo artist's availability, indicate tattoo related event, such as a convention, is occurring in the near future, indicate a tattoo artist won an industry award, prompt the user for feedback, indicate that a tattoo artist is in high demand, indicate that a new tattoo establishment opened, indicate new features or functionality, and/or indicate that a tattoo artist will be visiting the user's city. In one or more embodiments, when the link 252 is selected, utilizing the one or more input devices 204, the instructions stored in the memory 202 display on the display 203 of the electronic device 200 a new email message window populated with the email address of the tattoo service provider and the user's preferences, such as tattoo style, location, budget, geographic location, etc. (e.g., in response to a user selecting the link 252, the software instructions stored in the memory 202 generate and display a template for the user to communicate with the tattoo service provider). Additionally, in one or more embodiments, the profile page of the tattoo establishment may include a link to enable the user the to pay the tattoo service provider. Furthermore, in one or more embodiments, the profile page of the tattoo service provider may include a visual indicium (e.g., a symbol and/or text) indicating that the tattoo service provider is the owner of the tattoo establishment.

In one or more embodiments, the visual appearance of the profile page may vary depending on whether the tattoo service provider has availability that satisfies the user's requested date(s) of availability. For instance, in one or more embodiments, the instructions stored in the memory 202, when executed by the processor 201, cause the processor to display the profile pages of the tattoo establishments that have availability satisfying the user's selected date(s) of availability with a first color (e.g., green) and to display the profile pages of the tattoo establishments that do not have availability satisfying the user's selected date(s) of availability with a second color (e.g., red) different than the first color. In one or more embodiments, the instructions stored in the memory 202, when executed by the processor 201, cause the processor to display the profile pages of the tattoo establishments that have availability satisfying the user's selected date(s) of availability with distinct visual indicia (e.g., highlights around the profile picture, graphics, dynamic images, such as vibrating or rotating icons) and to display the profile pages of the tattoo establishments that do not have availability satisfying the user's selected date(s) of availability without such distinct visual indicia.

In one or more embodiments, the memory 202 stores instructions that, when executed by the processor 201, cause the display 203 of the electronic device 200 to display a list of popular tattoo service providers. In one or more embodiments, the popularity of the tattoo service providers may be determined based on metrics obtained from use of the system or the computer-implemented method. For instance, in one or more embodiments, the popularity of the tattoo service providers may be determined based on the number of users that view the profile pages of the tattoo service providers.

In one or more embodiments, the memory 202 stores instructions that, when executed by the processor 201, cause the display 203 of the electronic device 200 to display context-specific images and/or graphics based, for example, on the date, the time of day, the geographic location of the electronic device or the desired location of the tattoo service provider, the weather, and/or an upcoming holiday. For example, in one or more embodiments, the memory 202 stores instructions that, when executed by the processor 201, cause the display 203 of the electronic device 200 to display one or more images and/or graphics each having a theme or style based on the weather and/or the season, such as an image of clouds, a cup of tea, a snowman, a sweater, and/or an umbrella when the weather is rainy, snowy, or cold (e.g., below a threshold temperature, such as approximately 40° F. (approximately 4.5° C.) or less). In one or more embodiments, the memory 202 stores instructions that, when executed by the processor 201, cause the display 203 of the electronic device 200 to display, for example, an image of Santa Claus, a reindeer, a Christmas tree, ornaments, a present, and/or a sleigh when the date is proximate (e.g., within a month or less) to Christmas day. In one or more embodiments, the memory 202 stores instructions that, when executed by the processor 201, cause the display 203 of the electronic device 200 to display, for example, one or more images related to one or more upcoming events in the geographic area where the electronic device 200 is located or in the desired location of the tattoo service provider, such as an image related to an upcoming concert, an upcoming parade, and/or an upcoming festival. In one or more embodiments, the memory 202 stores instructions that, when executed by the processor 201, cause the processor to display, on the display 203 of the electronic device 200, a plurality of images each having a theme or style based on the current location of the electronic device 200 or the desired location of the tattoo service provider, such as one or more images that symbolize the city in which the electronic device 200 is located or the city in which the tattoo service provider is located (e.g., tropical or island lifestyle themed images when the electronic device 200 is located in Hawaii, such as an image of a piña colada, an image of the sun, and/or an image of a surfboard).

In one or more embodiments, each of the context-specific images is associated with a series of attributes (e.g., color, style, pattern, etc.). In one or more embodiments, the electronic device 200 is configured to determine the contextual information (e.g., the weather, the season, the date, the time, upcoming holidays, and/or upcoming events) from the internal components of the electronic device (e.g., the memory 202 or an internal clock chip) and/or by transmitting, from the network adapter 205, a request to a remote electronic device, such as one of the servers 300, storing at least some of the contextual information. Selecting one or more of the images, utilizing the one or more input devices 204, inputs the attributes associated with those selected image(s) as the user's preferences. In one or more embodiments, selecting one of the images, utilizing the one or more input devices 204, may cause the electronic device 200 to display on the display 203 the profile page of the tattoo service provider associated with that image (e.g., the creator or author of the image). Displaying context-specific images is configured to inspire and encourage users to get a tattoo that the user may not have considered unprompted. In this manner, the systems and computer-implemented methods of the present disclosure are configured to increase the demand for tattoo services compared to conventional systems and computer-implemented methods that do not display context-specific images or graphics.

In one or more embodiments, the memory 202 stores instructions that, when executed by the processor 201, cause the display 203 of the electronic device 200 to display ornamental images and/or graphics based on one or more of the contextual parameters described above (e.g., season, holiday, weather, location, and/or upcoming events). For instance, in one or more embodiments, the memory 202 stores instructions that, when executed by the processor 201, cause the display 203 of the electronic device 200 to display an animation of snow falling across the display 203 when the weather where the electronic device 200 is located (or where the tattoo service provider is located) is snowing, when the season is winter, and/or when date is proximate to the Christmas holiday. In one or more embodiments, the memory 202 stores instructions that, when executed by the processor 201, cause the display 203 of the electronic device 200 to display images of snowmen, presents, Christmas trees, sleighs, and/or Santa Claus around a border or periphery of the display 203 when the season is winter and/or when date is proximate to the Christmas holiday.

In one or more embodiments, the memory 202 stores instructions that, when executed by the processor 201, cause the processor 201 to display, on the display 203 of the electronic device 200, a series of images of tattoos performed by various tattoo service providers, which enables users to explore the work performed by tattoo service providers. Each of the images of the tattoos is associated with one or more parameters or attributes, such as a theme or style depicted in the image (e.g., realism, Japanese, geometry, dot work, black work, old school, new school, neo-traditional and Maori, line work), a classification of the object depicted in the image (e.g., animals, characters, human portrait, landscape, flowers, or typography), and whether the image depicts a black and white tattoo or a color tattoo. For instance, an image of a human face tattoo may be associated with the theme parameter "realism" and the classification of the object parameter of "human portrait," and an image of a dragon tattoo may be associated with the theme parameter "Japanese style" and the classification of the object as "animal." Selecting, utilizing the one or more input devices 204 of the electronic device 200, one or more of the images inputs the parameter(s) associated with the selected images as the user's preference(s). In one or more embodiments, selecting one of the images, utilizing the one or more input devices 204, may cause the electronic device 200 to display on the display 203 the profile page of the tattoo service provider associated with that image (e.g., as shown in FIG. 8).

In one or more embodiments, the images of the tattoos or the tattoo designs may be stored in the memory 202 of the electronic device 200. In one or more embodiments, the images of the tattoos may be stored on a remote electronic device (e.g., one of the servers 300 depicted in FIG. 1 or an electronic device controlled by a tattoo artist or a tattoo establishment, such as a desktop computer, a laptop computer, a tablet computer, or a wearable electronic device) and accessed over the network 400 by the network adapter 205 of the electronic device 200. For instance, in one or more embodiments, the memory 202 stores instructions that, when executed by the processor 201, cause the network adapter 205 to transmit a request for one or more images of tattoos stored on a remote electronic device, to access (e.g., receive) those images stored on the remote electronic device, and to display those images on the display 203 of the electronic device 200. In one or more embodiments, the images of the tattoos or the tattoo designs may be manually associated (i.e., "tagged") with one or more parameters or attributes (e.g., design, theme, color, and/or object type) or the images may be automatically associated (i.e., "tagged") with one or more parameters or attributes utilizing, for example, artificial intelligence (e.g., a recurrent neural network (RNN) or a convolutional neural network (CNN)) trained to classify images. In this manner, tattoo service providers (e.g., tattoo artists and/or tattoo establishments) can indicate the types of styles or themes in which they specialize and thereby connect with potential customers seeking a tattoo matching the specialization of the tattoo artist or tattoo establishment.

Figure 9:
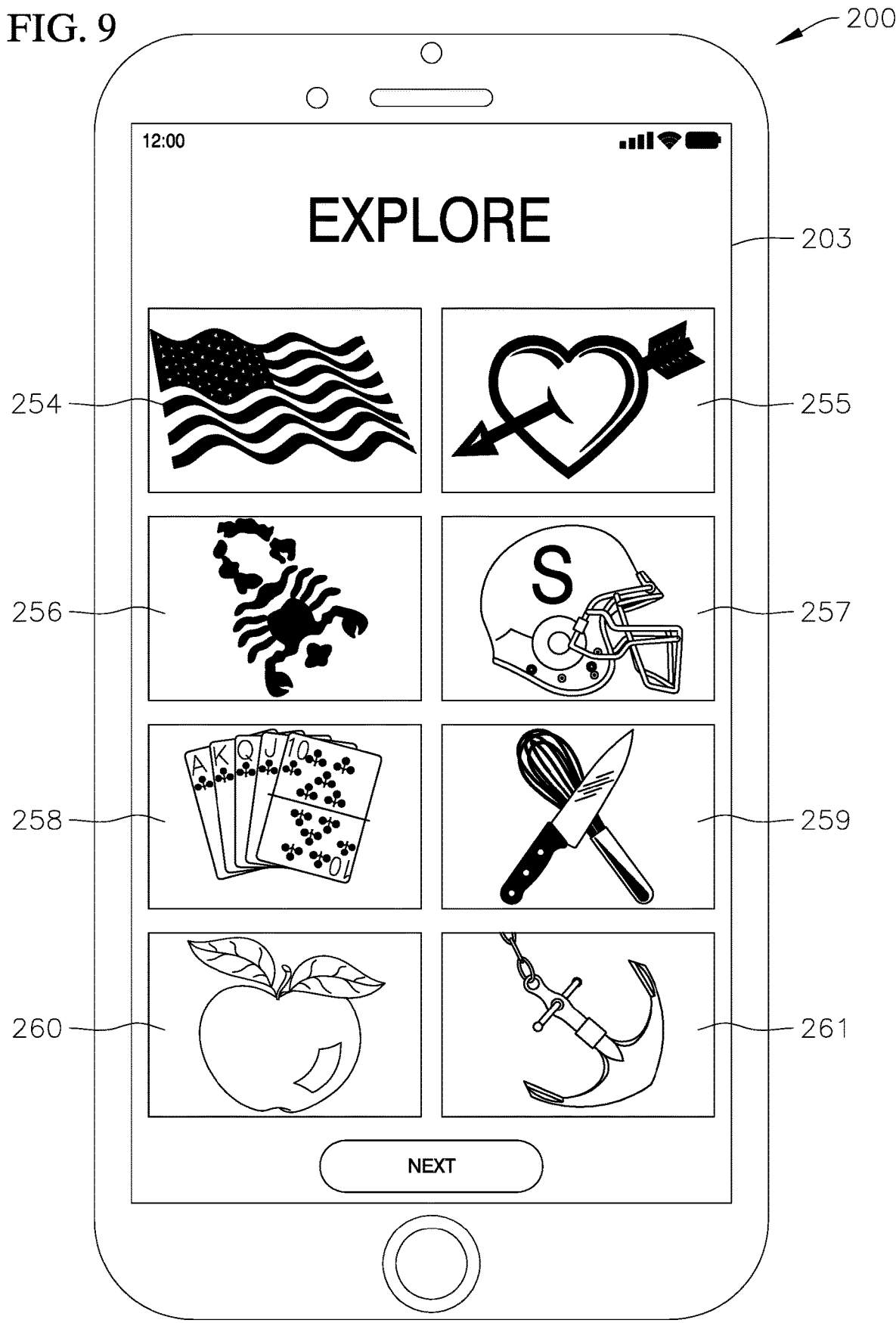
FIG. 9 depicts the display of the electronic device of FIG. 2 displaying a series of tattoo each being associated with one or more parameters.

FIG. 9 depicts the display 203 of the electronic device 200 displaying a series of images 254-261 of tattoos each associated with one or more parameters or attributes (e.g., tattoo style, theme, color, or classification) according to one embodiment of the present disclosure.

Figure 10:
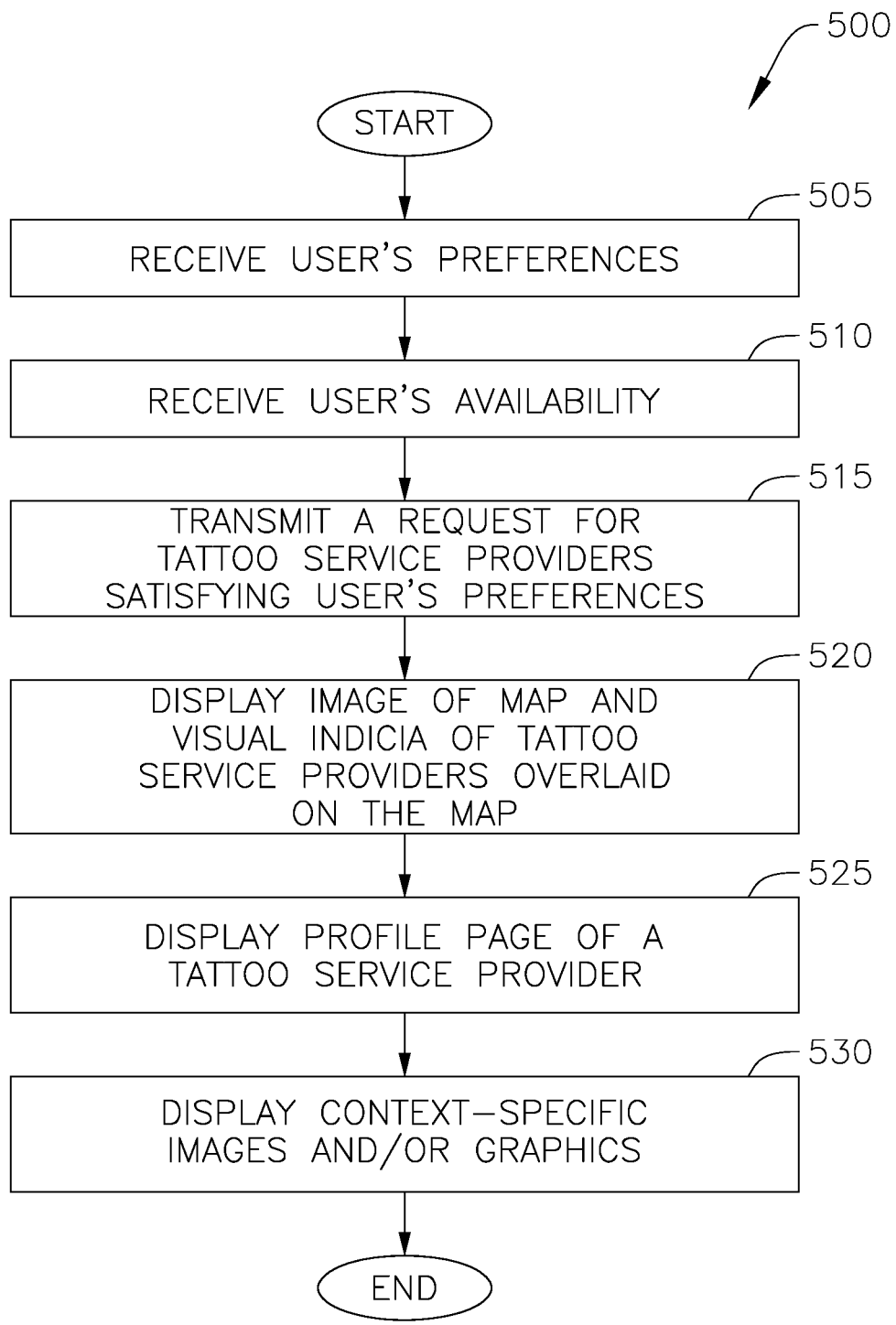
FIG. 10 is a flowchart depicting tasks of a computer-implemented method of identifying tattoo establishments according to one embodiment of the present disclosure.

FIG. 10 is a flowchart depicting operations (i.e., tasks) of a computer-implemented method 500 of identifying tattoo service providers satisfying the user's specified preferences according to one embodiment of the present disclosure. In one or more embodiments, the computer-implemented method 500 of the present disclosure may be performed utilizing a non-transitory computer-readable storage medium (e.g., computer memory) having software instructions (e.g., a software program) stored therein that are configured to perform one or more functions when executed by a processor, such as reading and/or writing data to and from the memory, and/or sending commands to, and/or receiving data from, one or more remote electronic devices (e.g., one or more servers) and/or various other components of the electronic device, including a display and a network adapter The non-transitory computer readable storage medium, the software instructions stored therein, the processor, the display, and the network adapter are provided in an electronic device (e.g., a mobile or a non-mobile electronic device, such as, for example, a desktop computer, a laptop computer, a smartphone, a wearable device, such as a smart watch or smart glasses, or a tablet computer). Additionally, in one or more embodiments, the computer-implemented method 500 may be performed by communicating with one or more remote electronic devices (e.g., one or more servers) over a network. In one or more embodiments, the electronic device may be operated by a user desirous to identify tattoo service providers satisfying a set of preferences (e.g., tattoo placement, style, color, availability, budget, and/or geographic location) that may be specified by, for example, creating a user account on the electronic device. Additionally, in one or more embodiments, tattoo service providers (e.g., tattoo artists or tattoo establishments) may create a provider account on one of the remote electronic devices (e.g., one or more of the servers) that includes a series of parameters associated with the tattoo service provider, such as, for example, geographic location, availability (e.g., dates, times, walk-ins accepted, and/or appointments required), specialization (e.g., color tattoos, Japanese style), and/or price (e.g., hourly rate or fixed fee). Accordingly, as described in more detail below, the computer-implemented method 500 enables a user to identify suitable tattoo service providers by receiving the user's preferences at the electronic device 500 and communicating over the network with the one or more remote electronic devices (e.g., one or more servers) to access the tattoo service providers' parameters.

In the illustrated embodiment, the computer-implemented method 500 includes one or more operations (i.e., tasks) 505 of receiving, at the electronic device, the user's preferences (e.g., tattoo placement, style, color, availability, budget, and/or geographic location). In one or more embodiments, the user preferences may be input utilizing one or more of the input devices of the electronic device, such as a touch sensitive display, a keyboard, a microphone, and/or a mouse. In one or more embodiments, the operation(s) 505 of receiving the user's preferences may include displaying, on the display of the electronic device, a series of images depicting different body parts or different locations on the body (e.g., as shown in FIG. 3), displaying a series of images of tattoos or tattoo designs each associated with one or more tattoo styles (e.g., as shown in FIG. 4), and/or displaying a series of images each associated with a theme or general idea (e.g., as shown in FIG. 5). Selecting, utilizing the one or more input devices of the electronic device, one or more of the images corresponding to the desired body part or desired body location for the tattoo, one or more of the images of the tattoos or tattoo designs each associated with one or more tattoo styles, and/or one or more images each associated with a general theme or idea inputs the body part(s) (or body location(s)), the tattoo style(s), and the general theme(s) (or idea(s)) associated with the selected images as the user's preferences. In one or more embodiments, the user's preferences may be entered in any other suitable manner, such as, for example, by selecting the body part(s) (or body location(s)), the tattoo style(s), and the general theme(s) (or idea(s)) from one or more lists, or by typing the body part(s) (or body location(s)), the tattoo style(s), and the general theme(s) (or idea(s)) into one or more text boxes.

In the illustrated embodiment, the computer-implemented method 500 includes an operation 510 of receiving, at the electronic device, the user's availability. The user's availability may be input utilizing one or more of the input devices of the electronic device, such as a touch sensitive display, a keyboard, a microphone, and/or a mouse. In one or more embodiments, the operation 510 of receiving the user's availability may include displaying, on the display of the electronic device, a "Country" dropdown box to enable the user to select the country (from a list of countries) in which tattoo service provider is located and a "City" dropdown box to enable the user to select the city (from a list of cities) in which the tattoo service provider is located (e.g., as shown in FIG. 6). In one or more embodiments, the user's preferred location may be input into the electronic device in any other suitable manner, such as, for example, by typing, utilizing one of the input devices of the electronic device, the desired location (e.g., city, postal code, address, or area in proximity thereto) into a text box, or by interacting with an interactive map displayed on the display to define the preferred area, such as by drawing a perimeter around the preferred area.

In the illustrated embodiment, the computer-implemented method 500 includes an operation 515 of transmitting, from the electronic device to one or more remote electronic devices, a request for tattoo service providers that satisfy the user's preferences. In one or more embodiments, the request in operation 515 may be performed by transmitting a signal via the network adapter of the electronic device to one or more remote electronic devices (e.g., one or more servers) over a wired or wireless network.

In the illustrated embodiment, the computer-implemented method 500 includes an operation 520 of displaying, on the display of the electronic device, an image of a map and visual indicia overlaid on the map of the tattoo establishments satisfying the user's preferences (e.g., as shown in FIG. 7). In one or more embodiments, the operation 520 includes displaying the visual indicia of the tattoo establishments that have availability satisfying the user's selected date(s) of availability differently than the tattoo establishments that do not have availability satisfying the user's selected date(s) of availability. For instance, in one or more embodiments, the operation 520 may include displaying the visual indicia of the tattoo establishments that have availability satisfying the user's selected date(s) of availability with a first color (e.g., green) and displaying the visual indicia of the tattoo establishments that do not have availability satisfying the user's selected date(s) of availability with a second color (e.g., red) different than the first color. In one or more embodiments, the operation 520 includes displaying the visual indicia of the tattoo establishments that have availability satisfying the user's selected date(s) of availability with a static image and displaying the visual indicia of the tattoo establishments that do not have availability satisfying the user's selected date(s) of availability with a dynamic image (e.g., a vibrating or rotating icon). Additionally, in one or more embodiments, the operation 520 includes displaying the visual indicia of the tattoo establishments that do not have availability satisfying the user's selected date(s) of availability with a timer displaying a difference between the first date of availability of each of the respective tattoo establishments and the user's selected date(s) of availability.

In the illustrated embodiment, the computer-implemented method 500 includes an operation 525 of displaying, on the display of the electronic device, a profile page of one of the tattoo service providers (e.g., the profile page depicted in FIG. 8). In one or more embodiments, the profile page may be displayed when the user selects, utilizing one of the input devices of the electronic device, one of the tattoo establishments displayed on the map in operation 520. In one or more embodiments, the profile page may display one or more of the following: user reviews, a physical address, an email address, a telephone number, and one or more themes or styles of specialization (e.g., Neo-Japanese); a series of images of tattoos from the tattoo portfolio of the tattoo artist or the tattoo establishment; a series of sketches of tattoo designs; a link to enable a user to message the tattoo establishment; and a link to enable a user to connect (i.e., "follow") the tattoo establishment.

In the illustrated embodiment, the computer-implemented method 500 includes an operation 530 of displaying, on the display of the electronic device, context-specific images and/or graphics based, for example, on the date, the time of day, the geographic location of the electronic device or the desired location of the tattoo service provider, the weather, and/or an upcoming holiday. In one or more embodiments, the context-specific images and/or graphics may include one or more images and/or graphics each having a theme or style based on the weather and/or the season, such as an image of clouds, a cup of tea, a snowman, a sweater, and/or an umbrella when the weather is rainy, snowy, or cold (e.g., below a threshold temperature, such as approximately 40° F. (approximately 4.5° C.) or less). In one or more embodiments, the context-specific images and/or graphics may include an image of Santa Claus, a reindeer, a Christmas tree, ornaments, a present, and/or a sleigh when the date is proximate (e.g., within a month or less) to Christmas day. In one or more embodiments, the context-specific images and/or graphics may include one or more images related to one or more upcoming events in the geographic area where the electronic device is located or in the desired location of the tattoo service provider, such as an image related to an upcoming concert, an upcoming parade, and/or an upcoming festival. In one or more embodiments, the context-specific images and/or graphics may include a plurality of images each having a theme or style based on the current location of the electronic device or the desired location of the tattoo service provider, such as one or more images that symbolize the city in which the electronic device is located or the city in which the tattoo service provider is located (e.g., tropical or island lifestyle themed images when the electronic device is located in Hawaii, such as an image of a piña colada, an image of the sun, and/or an image of a surfboard). In one or more embodiments, the context-specific images and/or graphics may include an animation of snow falling across the display when the weather where the electronic device is located (or where the tattoo service provider is located) is snowing, when the season is winter, and/or when date is proximate to the Christmas holiday. In one or more embodiments, the context-specific images and/or graphics may include images of snowmen, presents, Christmas trees, sleighs, and/or Santa Claus around a border or periphery of the display when the season is winter and/or when date is proximate to the Christmas holiday.

In one or more embodiments, the systems and computer-implemented methods of the present disclosure are configured to enable tattoo artists to identify tattoo shops (or tattoo shop owners) that have availability for guest work or a full-time position based on a set of parameters specified by the tattoo artist, such as, for example, geographic location, pricing (e.g., hourly rate or flat fee), and style specialization. A person of ordinary skill in the art will also readily appreciate that the systems and computer-implemented methods of the present disclosure are configured to enable tattoo shops (or tattoo shop owners) that have availability for guest work of a full-time position to identify tattoo artists who are seeking work and who satisfy a set of parameters specified by the tattoo shop (or the tattoo shop owner), such as, for example, geographic location, pricing (e.g., hourly rate or flat fee), and style specialization.

In one or more embodiments, the memory 202 stores instructions that, when executed by the processor 201, cause the electronic device 200 to receive a plurality of parameters of a tattoo artist that are input by a user of the electronic device (e.g., input by the tattoo artist utilizing the one or more input devices 204). The parameters may be any combination of two or more of the following: tattoo style or theme specialization of the tattoo artist (e.g., realism, Japanese, dot work, black work, old school, new school, micro-tattoo ("single-needle"), neo-traditional, tribal (e.g., Celtic, Maori, Polynesian, Tibetan), or line work), a geographic location of the tattoo establishment (e.g., a city or a postal code, or a specified proximity thereto), pricing (e.g., an hourly rate or a fixed or flat fee that the tattoo establishment or the individual tattoo artist charges), and whether the tattoo artist specializes in color or black and white tattoos. In one or more embodiments, the parameters of the tattoo artist may include any other suitable parameters, such as, for example, the size of the tattoo that the tattoo artist specializes in performing (e.g., small, medium, or large, such as a project requiring multiple tattoo sessions), the concept or classification of the objects that the tattoo artist specializes in performing (e.g., scene, animals, geometry, characters, nature, human portrait, fantasy, object, abstract, symbols, landscape, flowers, or typography), the experience of the tattoo artist (e.g., the years of experience), whether the tattoo artist is seeking a full-time position or a temporary guest position, the reviews of the tattoo shop (e.g., the average user rating of the tattoo establishment, such as 4 out of 5 stars or higher), whether the tattoo shop accepts walk-in clientele or is a private, by-appointment only establishment, and/or the tattoo artist's desired date(s) to work in the tattoo shop. The user may input the parameters of the tattoo artist by the one or more input devices 204 of the electronic device 200, such as a mouse, a keyboard, a microphone, and/or a touch-sensitive display.

Figure 11:
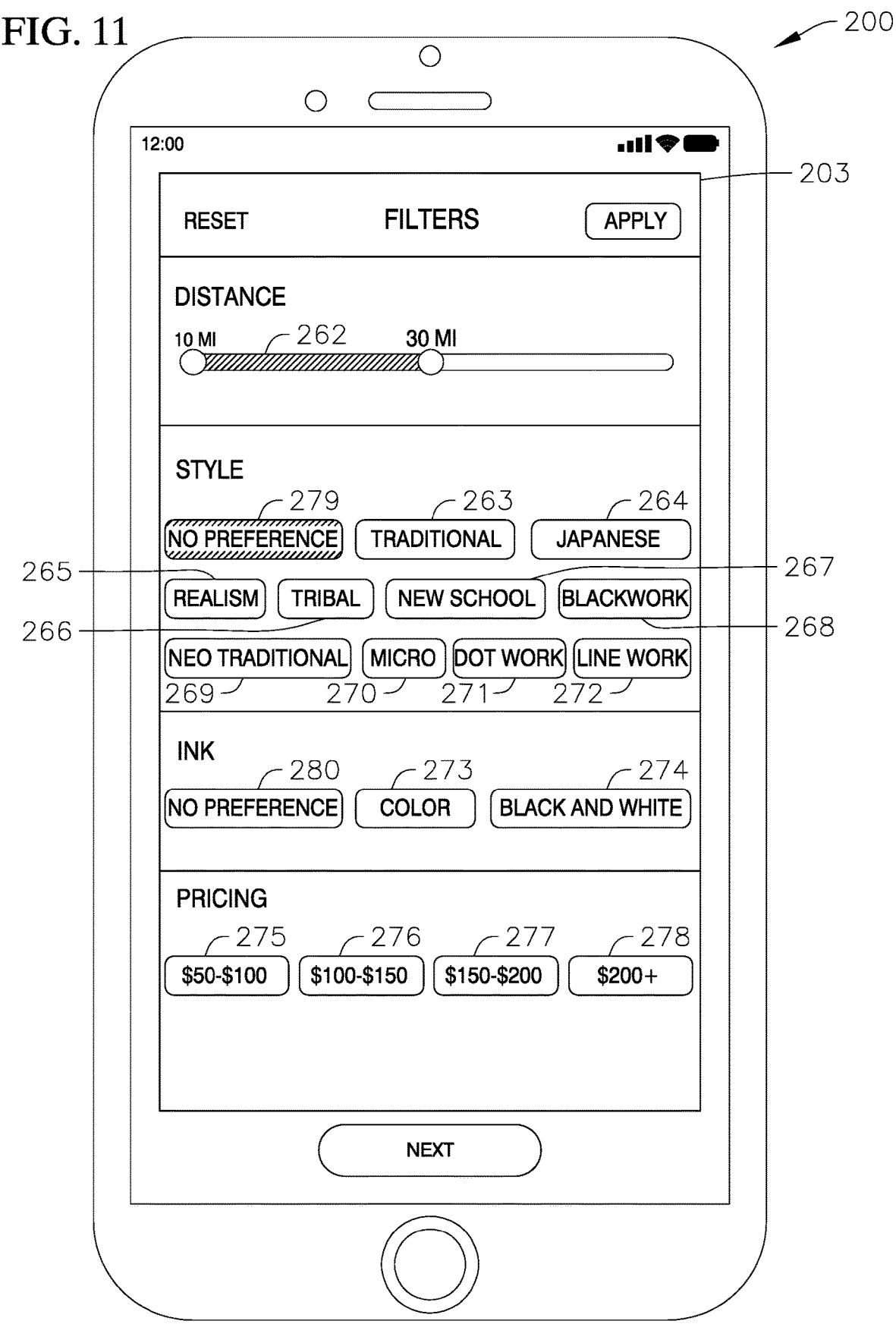
FIG. 11 depicts a display of an electronic device displaying a series of images associated with a series of parameters configured to enable tattoo artists to identify suitable tattoo shops in need of a tattoo artist according to one embodiment of the present disclosure.

In one or more embodiments, the memory 202 stores instructions that, when executed by the processor 201, cause the processor 201 to display, on the display 203 of the electronic device 200, one or more images, text boxes, and/or dropdown menus that enable a user to input the parameters of the tattoo artist. FIG. 11 depicts the display 203 of the electronic device 200 displaying, according to one embodiment of the present disclosure, a slider 262 associated with the desired geographic location of the tattoo establishment, a series of images 263-272 (e.g., virtual buttons) each associated with a tattoo style (e.g., traditional, Japanese, realism, tribal (such as Celtic, Maori, Polynesian), new school, black work, neo-traditional, micro-tattoo ("needle work"), dot work, and line work, respectively), images 273-274 associated with color tattoos and black and white ("B&W") tattoos, respectively, and a series of images 275-278 associated with different pricing ranges offered by the tattoo artist (e.g., $50-$100; $100-$150; $150-$200; and greater than $200, respectively). In one or more embodiments the instructions stored in memory 202 may be configured to display any other suitable number of images of different tattoo styles and any other suitable number of images of different pricing ranges. In the illustrated embodiment, the display 203 of the electronic device 200 also displays an image 279 (e.g., a button) associated with no style preference, and an image 280 (e.g., a button) associated with no color preference.

In the illustrated embodiment, manipulating (e.g., dragging), utilizing the one or more input devices 204, the slider 262 inputs the desired proximity of the tattoo establishment relative to the current location of the electronic device 200. For example, in one or more embodiments, the position of the slider 262 inputs the desired location of the tattoo establishment as an area having a radius including (e.g., surrounding) the current geographic location of the electronic device 200 (e.g., the GPS coordinates of the electronic device 200 obtained from a GPS device in the electronic device 200). In one or more embodiments, the tattoo artist's desired geographic location may be input in any other suitable manner, such as, for example, by typing, utilizing one of the input devices 204 of the electronic device 200, the desired location (e.g., city, postal code, address, or area in proximity thereto) into a text box, or by interacting with an interactive map displayed on the display 203 to define the preferred area, such as by drawing a perimeter around the preferred area.

Additionally, in the illustrated embodiment, selecting, utilizing the one or more input devices 204, one or more of the images 263-272 inputs the selected style(s) as the tattoo artist's specialization, and selecting, utilizing the one or more input devices 204, the image 235 and/or the image 236 inputs whether the tattoo artist specializes in color tattoos, black and white tattoos, or both. In one or more embodiments, the tattoo artist's style(s) specialization and pricing range(s) may be entered in any other suitable manner, such as, for example, by selecting the desired style(s) and/or pricing ranges from a list of styles or prices (e.g., a drop-down list), or by typing the style(s) and/or pricing range(s) into a text box. Furthermore, in the illustrated embodiment, selecting, utilizing the one or more input devices 204, the image 279 associated with no style preference inputs all available styles as the tattoo artist's style specialization, and selecting, utilizing the one or more input devices 204, the image 280 associated with no color preference inputs both color and black and white as the tattoo artist's color specialization.

In one or more embodiments, the memory 202 stores instructions that, when executed by the processor 201, cause the network adapter 205 of the electronic device 200 to transmit, from the network adapter 205 of the electronic device 200 to a remote electronic device (e.g., one of the servers 300) over the network 400, a request for tattoo establishments that have availability for a tattoo artist (e.g., either a guest position or a full-time position) and match (i.e., satisfy) the parameters of the tattoo artist (e.g., the tattoo artist's style specialization, pricing, and desired location) that were input into the electronic device 200 in the manner described above.

In one or more embodiments, the memory 202 stores instructions that, when executed by the processor 201, cause the network adapter 205 of the electronic device 200 to receive a batch or a list of a plurality of tattoo establishments from the remote electronic device (e.g., one of the servers 300) over the network 400. The plurality of tattoo establishments received by the electronic device 200 have availability for a tattoo artist and match (i.e., satisfy) the parameters of the tattoo artist. In one or more embodiments, each of the tattoo establishments is associated with a set of geographic coordinates (e.g., GPS coordinates including a latitude, a longitude, and an elevation position). Although in one or more embodiments the geographic coordinates may be defined in terms of latitude, longitude, and elevation, in one or more embodiments the geographic coordinates may be represented in any other suitable system for defining a particular geographic location.

In one or more embodiments, the memory 202 stores instructions that, when executed by the processor 201, cause the processor to display, on the display 203 of the electronic device 200, an image of a map containing the geographic location or area that was specified as one of the parameters of the tattoo artist (e.g., a map depicting a city or a portion thereof).

In one or more embodiments, the memory 202 stores instructions that, when executed by the processor 201, cause the processor to display, on the display 203 of the electronic device 200, visual indicia (e.g., markers or virtual "pins") of the tattoo establishments overlaid on the image of the map. In one or more embodiments, the locations of the visual indicia of the tattoo establishments on the image of the map are based on the geographic coordinates of the tattoo establishments (i.e., the visual indicia of the tattoo establishments are located at positions on the map corresponding to the geographic locations of the tattoo establishments). For instance, a tattoo establishment located at 123 Main Street may be depicted with a marker on the portion of the map corresponding to that address.

Figure 12:
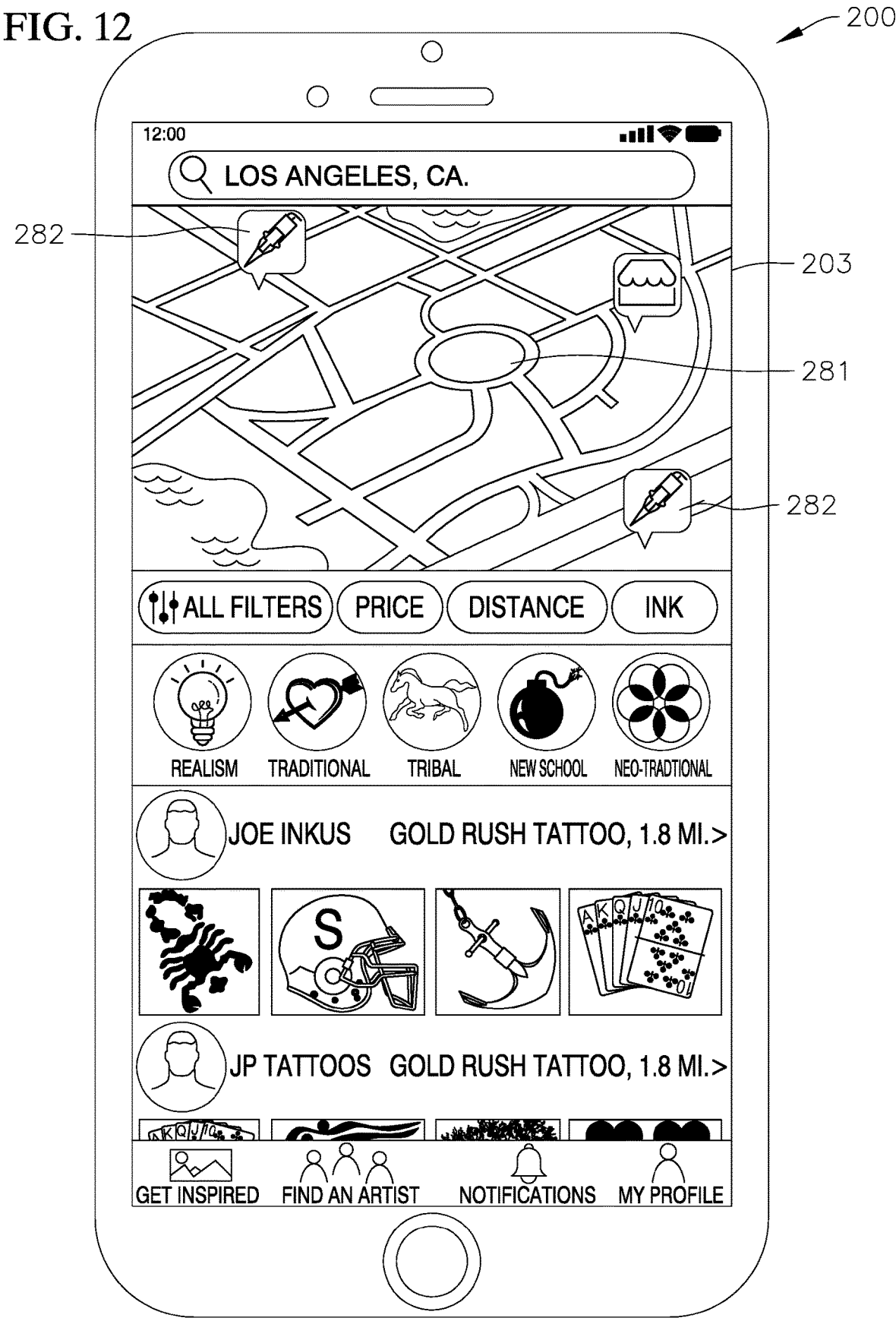
FIG. 12 depicts a display of an electronic device displaying an image of a map and a series of markers overlaid on the map indicating the tattoo shops that have employment opportunities satisfying the tattoo artist's parameters according to one embodiment of the present disclosure.

FIG. 12 depicts the display 203 of the electronic device 200 displaying an image of a map 281 and visual indicia 282

(e.g., markers or virtual pins) of the tattoo establishments overlaid on the image of the map 281. Visual indicia 282 of the tattoo establishments may include images, photographs, graphics, animations, videos, and/or combinations thereof. For instance, in one or more embodiments, the visual indicia 282 of the tattoo establishments may include a trademark of the tattoo establishment (e.g., a logo), a photograph of the storefront of the tattoo establishment, or a standard drop pin. In this manner, the systems and computer-implemented methods of the present disclosure enable tattoo artists seeking work (and tattoo establishments having availability for another tattoo artist) to identify each other.

In one or more embodiments, the systems and computer-implemented methods of the present disclosure are configured to enable tattoo shops (or tattoo shop owners) that have availability for guest work of a full-time position to identify tattoo artists who are seeking work and who satisfy a set of parameters specified by the tattoo shop (or the tattoo shop owner), such as, for example, geographic location, pricing (e.g., hourly rate or flat fee), style specialization, reviews (e.g., the average user rating of the tattoo establishment, such as 4 out of 5 stars or higher), duration of employment (e.g., guest spot or full-time position), and type of establishment (e.g., accepting walk-in clientele or a private, by-appointment-only shop).

In one or more embodiments, the memory 202 stores instructions that, when executed by the processor 201, cause the electronic device 200 to receive a plurality of parameters of a tattoo shop (or tattoo shop owners) that are input by a user of the electronic device (e.g., input by the tattoo shop or the tattoo shop owner utilizing the one or more input devices 204). The parameters may be any combination of two or more of the following: a geographic location of the tattoo establishment (e.g., a city or a postal code, or a specified proximity thereto), tattoo style or theme specialization of the desired tattoo artist (e.g., realism, Japanese, dot work, black work, old school, new school, micro-tattoo ("single-needle"), neo-traditional, tribal (e.g., Celtic, Maori, Polynesian, Tibetan), or line work), the user reviews of the desired tattoo artist (e.g., 4 out of 5 stars or higher), whether the tattoo shop is seeking a temporary, guest position or a full-time position, the tattoo shop's available dates to employ or host the tattoo artist, and whether the tattoo shop accepts walk-in clientele or is a private, by-appointment only establishment. In one or more embodiments, the parameters of the tattoo shop (or the tattoo shop owner) may include any other suitable parameters, such as, for example, the size of the tattoo that the desired tattoo artist specializes in performing (e.g., small, medium, or large, such as a project requiring multiple tattoo sessions), the concept or classification of the objects that the desired tattoo artist specializes in performing (e.g., scene, animals, geometry, characters, nature, human portrait, fantasy, object, abstract, symbols, landscape, flowers, or typography), the experience of the desired tattoo artist (e.g., the years of experience), the desire tattoo artist's pricing (e.g., an hourly rate or a fixed or flat fee that the tattoo artist charges), and whether the desired tattoo artist specializes in color or black and white tattoos. The user may input the parameters of the tattoo artist by the one or more input devices 204 of the electronic device 200, such as a mouse, a keyboard, a microphone, and/or a touch-sensitive display.

Figure 13:
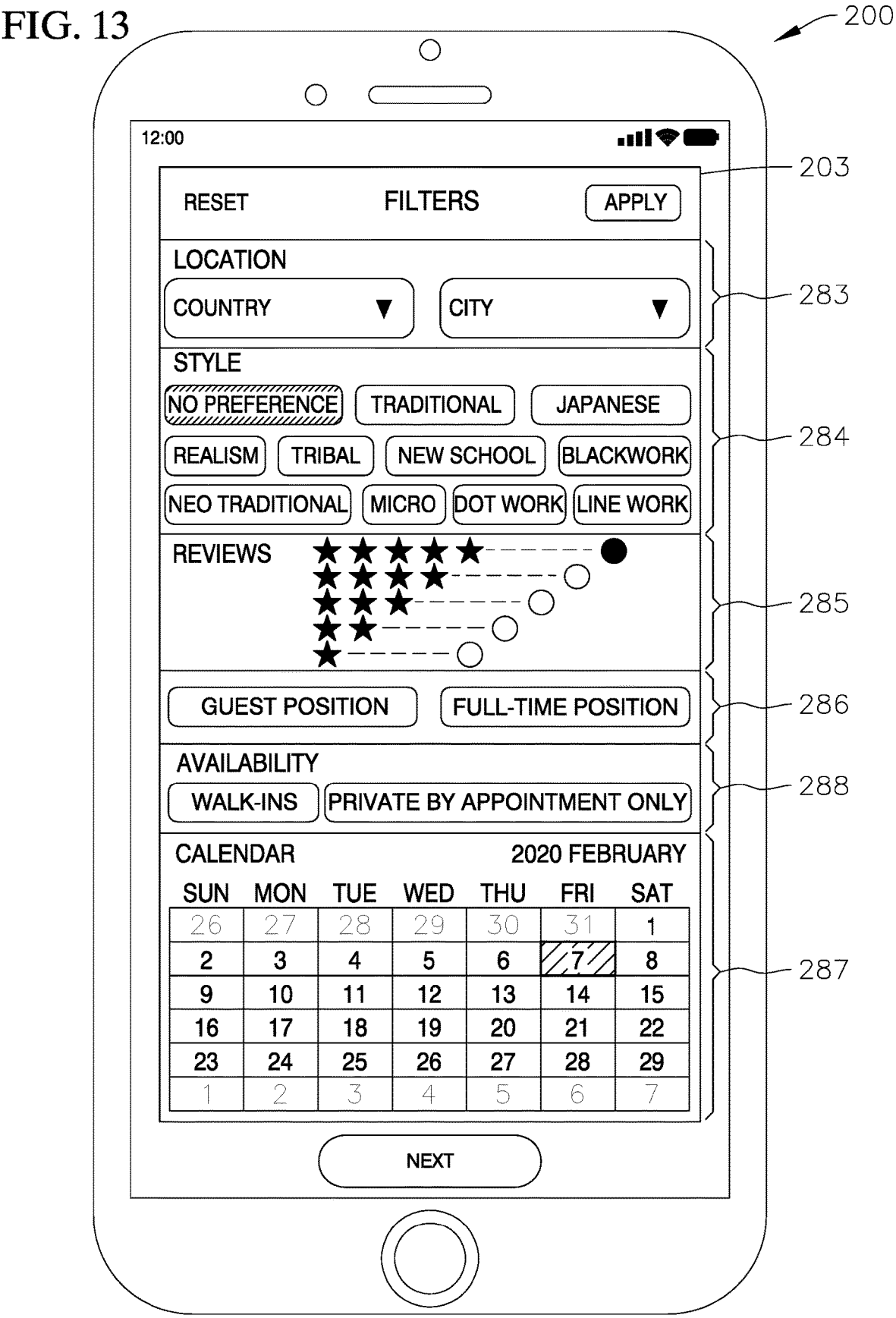
FIG. 13 depicts a display of an electronic device displaying a series of images associated with a series of parameters configured to enable tattoo shops (or tattoo owners) in need of a tattoo artist to identify suitable tattoo artists according to one embodiment of the present disclosure.

In one or more embodiments, the memory 202 stores instructions that, when executed by the processor 201, cause the processor 201 to display, on the display 203 of the electronic device 200, one or more images, text boxes, and/or dropdown menus that enable a user to input the parameters of the tattoo shop (or the tattoo owner), including the required characteristics of the tattoo artist sought by the tattoo shop (or the tattoo owner). FIG. 13 depicts the display 203 of the electronic device 200 displaying, according to one embodiment of the present disclosure, dropdown boxes 283 that enable the tattoo shop (or the tattoo shop owner) to enter the geographic location of the tattoo establishment, a series of images 284 (e.g., virtual buttons) each associated with a different tattoo style specialization of the desired tattoo artist sought by the tattoo shop (e.g., traditional, Japanese, realism, tribal (such as Celtic, Maori, Polynesian), new school, black work, neo-traditional, micro-tattoo ("needle work"), dot work, and line work, respectively), one or more images 285 indicating the reviews (e.g., number of stars out of five stars) of the desired tattoo artist, images 286 indicating whether the tattoo shop is seeking a temporary, guest position or a full time position, respectively, an 287 image (e.g., a calendar) enabling the tattoo shop (or the tattoo owner) to indicate the date(s) of availability of the tattoo shop to employ or host a tattoo artist, and images 288 indicating whether the tattoo shop accepts walk-in clientele or is a private, by-appointment only shop, respectively. In the illustrated embodiment, the images 284 also include an image (e.g., a button) associated with no style preference.

In the illustrated embodiment, selecting, utilizing the one or more input devices 204, the desired city and country from the dropdown boxes 283 inputs the location of the tattoo shop. In one or more embodiments, the tattoo shop's geographic location may be input in any other suitable manner, such as, for example, by typing, utilizing one of the input devices 204 of the electronic device 200, the desired location (e.g., city, postal code, address, or area in proximity thereto) into a text box, by interacting with an interactive map displayed on the display 203 to define the preferred area, such as by drawing a perimeter around the preferred area, or by inputting the GPS coordinates of the electronic device 200 obtained from a GPS device of the electronic device 200.

Additionally, in the illustrated embodiment, selecting, utilizing the one or more input devices 204, one or more of the images 284 inputs the selected style(s) as the tattoo artist's style specialization. In one or more embodiments, the tattoo artist's style(s) specialization may be entered in any other suitable manner, such as, for example, by selecting the desired style(s) from a list of styles (e.g., a dropdown list), or by typing the style(s) into a text box. Furthermore, in the illustrated embodiment, selecting, utilizing the one or more input devices 204, the image associated with no style preference inputs all available styles as the tattoo shop's desired specialization.

In the illustrated embodiment, selecting one or more of the images 285, selecting one or more of the images 286, selecting one of the images 287, and selecting the image 288, utilizing the one or more input devices 204, inputs the review score or the minimum acceptable review score of the desired tattoo artist, inputs the type of position (e.g., guest position or full-time position), inputs the dates of availability of the tattoo shop to employ or host a tattoo artist, and inputs whether the tattoo shop accepts walk-in clientele or is a private, by-appointment shop, respectively.

In one or more embodiments, the memory 202 stores instructions that, when executed by the processor 201, cause the network adapter 205 of the electronic device 200 to transmit, from the network adapter 205 of the electronic device 200 to a remote electronic device (e.g., one of the servers 300) over the network 400, a request for tattoo artists that match (i.e., satisfy) the parameters of the tattoo shop or the tattoo shop owner (e.g., the geographic location of the tattoo shop, the desired tattoo artist's style specialization, the desired tattoo artist's reviews, the availability to fill a temporary guest position or a full-time position, the date(s) of availability of the tattoo shop to host or employ a tattoo artist, and the type of tattoo shop (walk-ins or by-appointment only)) that were input into the electronic device 200 in the manner described above.

In one or more embodiments, the memory 202 stores instructions that, when executed by the processor 201, cause the network adapter 205 of the electronic device 200 to receive a batch or a list of a plurality of tattoo artists from the remote electronic device (e.g., one of the servers 300) over the network 400. The plurality of tattoo artists received by the electronic device 200 have match (i.e., satisfy) the parameters specified by the tattoo shop or tattoo shop owner. In one or more embodiments, each of the tattoo artists is associated with a set of geographic coordinates (e.g., GPS coordinates including a latitude, a longitude, and an elevation position). Although in one or more embodiments the geographic coordinates may be defined in terms of latitude, longitude, and elevation, in one or more embodiments the geographic coordinates may be represented in any other suitable system for defining a particular geographic location.

In one or more embodiments, the memory 202 stores instructions that, when executed by the processor 201, cause the processor to display, on the display 203 of the electronic device 200, an image of a map containing the geographic location or area that was specified as one of the parameters of the tattoo shop (e.g., a map depicting a city or a portion thereof).

In one or more embodiments, the memory 202 stores instructions that, when executed by the processor 201, cause the processor to display, on the display 203 of the electronic device 200, visual indicia (e.g., markers or virtual "pins") of the tattoo artists that satisfy the tattoo shop's (or the tattoo shop owner's) specified parameters overlaid on the image of the map. In one or more embodiments, the locations of the visual indicia of the tattoo artists on the image of the map are based on the geographic coordinates of the tattoo artists (i.e., the visual indicia of the tattoo artists are located at positions on the map corresponding to the geographic locations of the tattoo artists). For instance, a tattoo artist residing at 123 Main Street may be depicted with a marker on the portion of the map corresponding to that address.

Figure 14:
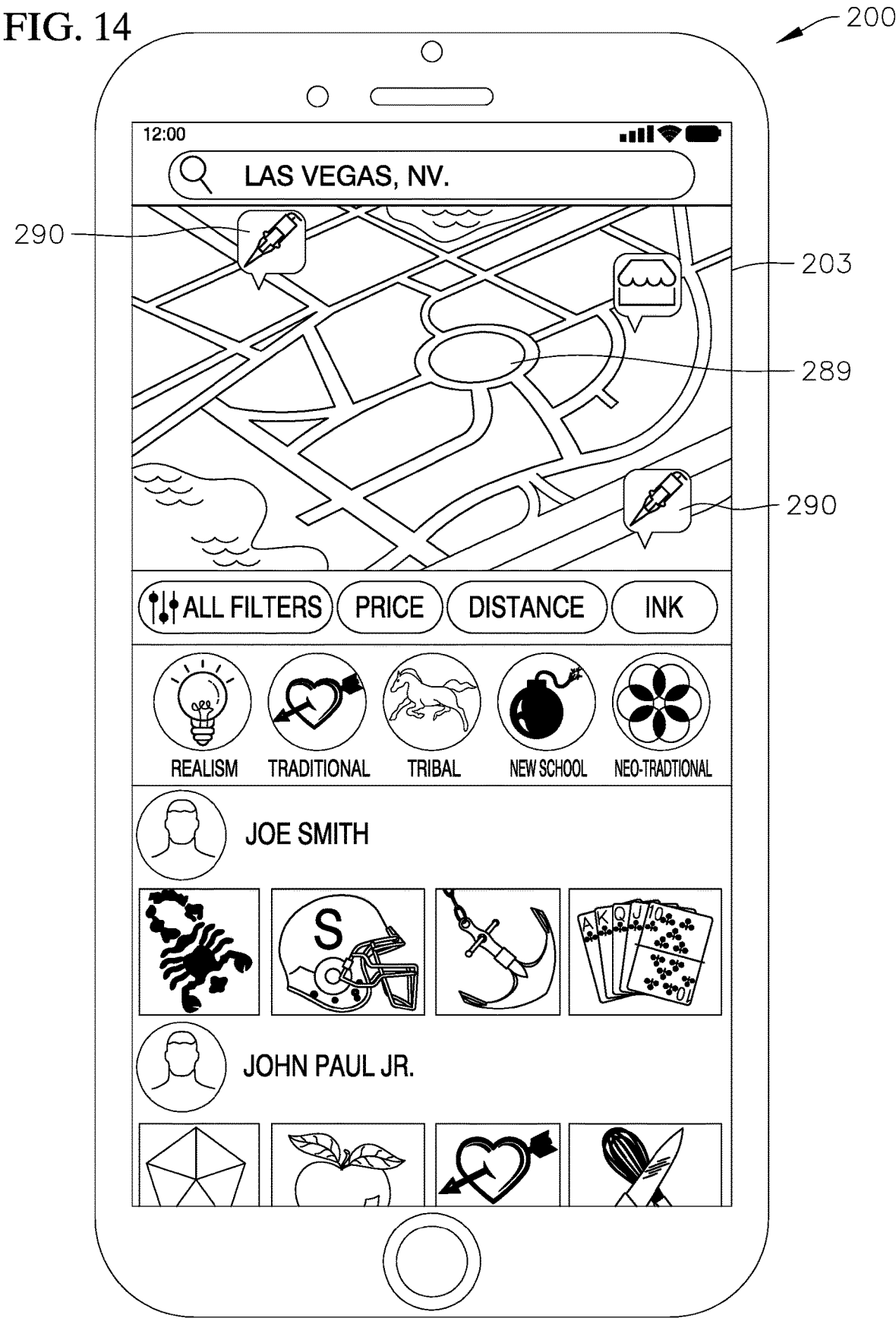
FIG. 14 depicts a display of an electronic device displaying an image of a map and a series of markers overlaid on the map indicating the tattoo artists that have availability satisfying the tattoo shop's (or tattoo owner's) parameters according to one embodiment of the present disclosure.

FIG. 14 depicts the display 203 of the electronic device 200 displaying an image 289 of a map and visual indicia 290 (e.g., markers or virtual pins) of the tattoo artists that satisfy the tattoo shop's (or the tattoo shop owner's) specified parameters overlaid on the image 289 of the map. Visual indicia 290 of the tattoo artists may include images, photographs, graphics, animations, videos, and/or combinations thereof. In this manner, the systems and computer-implemented methods of the present disclosure enable tattoo shops or tattoo shop owners that have availability for another tattoo artist (either as a temporary, guest position or a full-time position) to identify suitable tattoo artists who are seeking work.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, and equivalents thereof. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. As used herein, the term "substantially," "about," "approximately," and similar terms are used as terms of approximation and not as terms of degree, and are intended to account for the inherent deviations in measured or calculated values that would be recognized by those of ordinary skill in the art.

What is claimed is:

1. A non-transitory computer-readable storage medium having software instructions stored therein, which, when executed by a processor, cause the processor to:
   receive, at an electronic device having a display, a plurality of user preferences;
   receive, at the electronic device, an individual user's requested dates of availability;
   transmit a request, from the electronic device to a remote electronic device comprising a database of service providers, for tattoo service providers matching the plurality of user preferences;
   receive, at the electronic device, a plurality of tattoo service providers matching the plurality of user preferences from among the database of service providers stored on the remote electronic device;
   display, on the display of the electronic device, an image of a map comprising the individual user's desired geographic location; and
   display, on the display of the electronic device, the plurality of tattoo service providers with a plurality of visual indicia,
   wherein the plurality of visual indicia are overlaid on the image of the map based on geographic coordinates of the plurality of tattoo service providers,
   wherein the plurality of tattoo service providers comprises at least one first tattoo service provider matching the individual user's requested dates of availability, and at least one second tattoo service provider not matching the individual user's requested dates of availability,
   wherein the plurality of visual indicia comprises a first visual indicia for each of the at least one first tattoo service provider and a second visual indicia different than the first visual indicia for each of the at least one second tattoo service provider to enable the individual user to readily identify tattoo service providers satisfying the individual user's requested dates of availability,
   wherein the second visual indicia for each of the at least one second tattoo service provider not matching the individual user's requested dates of availability comprises a timer displaying a difference between a first date of availability of the at least one second tattoo service provider and the individual user's requested dates of availability, a time displayed by the timer being calculated independent of the geographic coordinates of the plurality of tattoo service providers and the individual user's desired geographic location, and
   wherein the first visual indicia for each of the at least one first tattoo service provider matching the individual user's requested dates of availability does not comprise a timer.

2. The storage medium of claim 1, wherein the plurality of user preferences are selected from the group of preferences consisting of tattoo style, tattoo classification, geographic location of tattoo service provider, body location of tattoo, budget, and tattoo size.

3. The storage medium of claim 1, wherein the first visual indicia comprises a first color, and wherein the second visual indicia comprises a second color different than the first color.

4. The storage medium of claim 1, wherein the first visual indicia comprises a dynamic image, and wherein the second visual indicia comprises a static image.

5. The storage medium of claim 1, wherein the software instructions, when executed by the processor, further cause the processor to:
   display, on the display of the electronic device, a plurality of images each depicting at least one tattoo and each being associated with a plurality of attributes of the at least one tattoo.

6. A computer-implemented method of identifying tattoo service providers, the method comprising:
   receiving, at an electronic device having a display, a plurality of user preferences;
   receiving, at the electronic device, an individual user's requested dates of availability;
   transmitting a request, from the electronic device to a remote electronic device comprising a database of service providers, for tattoo service providers matching the plurality of user preferences;
   receiving, at the electronic device, a plurality of tattoo service providers matching the plurality of user preferences from among the database of service providers stored on the remote electronic device;
   displaying, on the display of the electronic device, an image of a map comprising the individual user's desired geographic location; and
   displaying, on the display of the electronic device, the plurality of tattoo service providers with a plurality of visual indicia,
   wherein the plurality of visual indicia are overlaid on the image of the map based on geographic coordinates of the plurality of tattoo service providers,
   wherein the plurality of tattoo service providers comprises at least one first tattoo service provider matching the individual user's requested dates of availability, and at least one second tattoo service provider not matching the individual user's requested dates of availability,
   wherein the plurality of visual indicia comprises a first visual indicia for each of the at least one first tattoo service provider and a second visual indicia different than the first visual indicia for each of the at least one second tattoo service provider to enable the individual user to readily identify tattoo service providers satisfying the individual user's requested dates of availability,
   wherein the second indicia for each of the at least one second tattoo service provider not matching the individual user's requested dates of availability comprises a timer displaying a difference between a first date of availability of the at least one second tattoo service provider and the user's requested dates of availability, a time displayed by the timer being calculated independent of the geographic coordinates of the plurality of tattoo service providers and the individual user's desired geographic location, and
   wherein the first visual indicia for each of the at least one first tattoo service provider matching the individual user's requested dates of availability does not comprise a timer.

7. The method of claim 6, wherein the plurality of user preferences are selected from the group of preferences consisting of tattoo style, tattoo classification, geographic location of tattoo service provider, body location of tattoo, budget, and tattoo size.

8. The method of claim 6, wherein the first indicia comprises a first color, and wherein the second indicia comprises a second color different than the first color.

9. The method of claim 6, wherein the first indicia comprises a dynamic image, and wherein the second indicia comprises a static image.

10. The method of claim 6, further comprising displaying, on the display of the electronic device, a plurality of images each depicting at least one tattoo and each being associated with a plurality of attributes of the at least one tattoo.

11. The method of claim 10, wherein the inputting the user preferences comprises selecting at least one image of the plurality of images.

12. A system for identifying tattoo service providers on an electronic device, the system comprising:
   a display of the electronic device;
   a processor of the electronic device; and
   a non-transitory computer-readable storage medium of the electronic device coupled to the processor, the non-transitory computer-readable storage medium having software instructions stored therein, which, when executed by the processor, cause the processor to:
      receive, at an electronic device, a plurality of user preferences;
      receive, at the electronic device, an individual user's requested dates of availability;
      transmit a request, from the electronic device to a remote electronic device comprising a database of service providers, for tattoo service providers matching the plurality of user preferences;
      receive, at the electronic device, a plurality of tattoo service providers matching the plurality of user preferences from among the database of service providers;
      display, on the display of the electronic device, an image of a map comprising the individual user's desired geographic location; and
      display, on the display of the electronic device, the plurality of tattoo service providers with a plurality of visual indicia,
   wherein the plurality of visual indicia are overlaid on the image of the map based on geographic coordinates of the plurality of tattoo service providers,
   wherein the plurality of tattoo service providers comprises at least one first tattoo service provider matching the individual user's requested dates of availability, and at least one second tattoo service provider not matching the individual user's requested dates of availability,
   wherein the plurality of visual indicia comprises a first visual indicia for each of the at least one first tattoo service provider and a second visual indicia different than the first visual indicia for each of the at least one second tattoo service provider to enable the individual user to readily identify tattoo service providers satisfying the individual user's requested dates of availability,
   wherein the second visual indicia for each of the at least one second tattoo service provider not matching the individual user's requested dates of availability comprises a timer displaying a difference between a first date of availability of the at least one second tattoo service provider and the user's requested dates of availability, a time displayed by the timer being calculated independent of the geographic coordinates of the plurality of tattoo service providers and the individual user's desired geographic location, and wherein the first visual indicia for each of the at least one first tattoo service provider matching the individual user's requested dates of availability does not comprise a timer.

13. The system of claim 12, wherein the plurality of user preferences are selected from the group of preferences consisting of tattoo style, tattoo classification, geographic location of tattoo service providers, body location of tattoo, budget, and tattoo size.

14. The system of claim 12, wherein the first visual indicia comprises a first color and the second visual indicia comprises a second color different than the first color, or wherein the first visual indicia comprises a dynamic image and the second visual indicia comprises a static image.

* * * * *